(12) United States Patent
Mori

(10) Patent No.: US 8,656,287 B2
(45) Date of Patent: Feb. 18, 2014

(54) INFORMATION PROCESSING APPARATUS, INFORMATION PROCESSING SYSTEM, AND INFORMATION PROCESSING METHOD

(75) Inventor: Shinya Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 13/083,906

(22) Filed: Apr. 11, 2011

(65) Prior Publication Data

US 2011/0271199 A1 Nov. 3, 2011

(30) Foreign Application Priority Data

Apr. 28, 2010 (JP) ................................ 2010-104049

(51) Int. Cl.
*G06F 3/00* (2006.01)
(52) U.S. Cl.
USPC ........................... 715/744; 715/748; 715/761
(58) Field of Classification Search
USPC .......................................... 715/744, 748, 761
See application file for complete search history.

(56) References Cited

U.S. PATENT DOCUMENTS

| | | | |
|---|---|---|---|
| 6,078,890 A * | 6/2000 | Mangin et al. ..................... 705/2 |
| 6,327,628 B1 * | 12/2001 | Anuff et al. ..................... 719/311 |
| 6,356,910 B1 * | 3/2002 | Zellweger ..................... 715/273 |
| 7,768,576 B2 * | 8/2010 | Yui et al. ..................... 348/564 |
| 7,770,121 B2 * | 8/2010 | Jain et al. ..................... 715/744 |
| 8,307,304 B2 * | 11/2012 | Takahashi ..................... 715/826 |
| 8,375,314 B2 * | 2/2013 | Ishii ..................... 715/764 |
| 2003/0023641 A1 * | 1/2003 | Gorman et al. ..................... 707/530 |
| 2006/0236328 A1 | 10/2006 | DeWitt |
| 2008/0120129 A1 * | 5/2008 | Seubert et al. ..................... 705/1 |
| 2008/0141148 A1 | 6/2008 | Ogita |

FOREIGN PATENT DOCUMENTS

| | | |
|---|---|---|
| EP | 1 291 767 A2 | 3/2003 |
| JP | 2001-134423 | 5/2001 |
| JP | 2007-233802 | 9/2007 |
| JP | 2008-167417 | 7/2008 |

OTHER PUBLICATIONS

Extended European Search Report dated Aug. 22, 2011.
Japanese Office Action dated Oct. 22, 2013.

* cited by examiner

*Primary Examiner* — David Phantana Angkool
(74) *Attorney, Agent, or Firm* — IPUSA, PLLC

(57) ABSTRACT

An information processing apparatus connected to an image processing apparatus via a predetermined data transmission line includes a data analyzing part accessing a predetermined memory area which hold definition data in the information processing apparatus and analyzing the definition data for a display content of screens to be integrated when the information processing apparatus receives an instruction to integrate a plurality of the screens from a user, a data specifying part specifying data to be used for generating customizing screen definition data in which an integration display content of an integration screen is defined among the definition data based on an analysis result obtained by the data analyzing part, a generation part generating the customizing screen definition data based on data specified by the data specifying part, and a communicating part transmitting the customizing screen definition data generated by the generation part to the image processing apparatus.

18 Claims, 22 Drawing Sheets

FIG.6

[SCREEN DEFINITION DATA OF FUNCTION SELECTING SCREEN]

```
<!--FUNCTION SELECTION SCREEN-->
<Window id="SelectionWindow">

<!--FUNCTION A SELECTION BUTTON-->
  <Button id="ButtonA" label="FUNCTION A" x="100" y="100" h="100" w="100">
    <!--TRANSITION EVENT TO SCREEN OF FUNCTION A-->
    <Event>
      <Action>ScreenChange</Action>
      <Target>FunctionWindowA</Target>
    </Event>
  </Button>

<!--FUNCTION B SELECTION BUTTON-->
  <Button id="ButtonB" label="FUNCTION B" x="300" y="100" h="100" w="100">
    <!--TRANSITION EVENT TO SCREEN OF FUNCTION B-->
    <Event>
      <Action>ScreenChange</Action>
      <Target>FunctionWindowB</Target>
    </Event>
  </Button>

</Window>
```

Labels: $R_{B1}$, $R_{E1}$, $R_{B2}$, $R_{E2}$, $R_W$, 22Dss

FIG.7B

[SCREEN DEFINITION DATA OF FUNCTION B SETUP SCREEN]    22Dsb

```
<!--SCREEN OF FUNCTION B-->
<Window id="FunctionWindowB">

<!--FUNCTION B SETUP EDIT BOX-->
  <EditBox id="EditBoxB" label="SETUP B" x="50" y="150" w="700" h="100" />

<!--FUNCTION SELECTION SCREEN TRANSITING BUTTON-->
  <Button id="ButtonSetting" label="RETURN" x="550" y="20" w="200" h="20">
    <!--TRANSITION EVENT TO FUNCTION SELECTION SCREEN-->
    <Event>
      <Action>ScreenChange</Action>
      <Target>SelectionWindow</Target>
    </Event>
  </Button>

<!--COMMON SETUP SCREEN TRANSITING BUTTON-->
  <Button id="ButtonSetting" label="COMMON SETUP" x="450" y="300" w="250" h="300">
    <!--TRANSITION EVENT TO COMMON SETUP SCREEN-->
    <Event>
      <Action>ScreenChange</Action>
      <Target>ConfigurationWindow</Target>
    </Event>
  </Button>

</Window>
```

$R_{DB}$, $R_{B1}$, $R_{B2}$, $R_W$

[CUSTOMIZED (INTEGRATED) SCREEN DEFINITION DATA]

```xml
<Window id="MailWindow">
<!--FUNCTION SELECTION TAB-->
<Tabs id="FunctionTabs" x="300" y="50" w="450" h="400">

<!--FUNCTION A TAB-->
<Tab id="TabA" label="FUNCTION A">
    <ComboBox id="ComboBoxA" label="SETUP A" x="50" y="50" w="350" h="100">
        <Item>CHOICE 1</Item>
        <Item>CHOICE 2</Item>
        <Item>CHOICE 3</Item>
    </ComboBox>
</Tab>

<!--FUNCTION B TAB-->
<Tab id="TabB" label="FUNCTION B">
    <EditBox id="EditBoxB" label="SETUP B" x="50" y="50" w="350" h="100"/>
</Tab>

</Tabs>
<!--COMMON SETUP-->
<RadioButton id="RadioButton1" label="SETUP 1" x="25" y="50" w="200" h="200">
    <Button id="Button1On" label="ON" value="true" x="25" y="100" w="75" h="50" />
    <Button id="Button1Off" label="OFF" value="false" x="100" y="100" w="75" h="50" />
</RadioButton>
<RadioButton id="RadioButton2" label="SETUP 2" x="25" y="300" w="200" h="200">
    <Button id="Button2On" label="ON" value="true" x="25" y="350" w="75" h="50" />
    <Button id="Button2Off" label="OFF" value="false" x="100" y="350" w="75" h="50" />
</RadioButton>

</Window>
```

[CUSTOMIZING SETUP FILE]        31D

```
<?xml version="1.0" encoding="utf-8"?>

<root>
 <tab>
   <x>300</x>
   <y>50</y>
   <w>450</w>
   <h>400</h>

...

</root>
```

FIG.11B

[CUSTOMIZING SETUP FILE]  31D

```xml
<?xml version="1.0" encoding="utf-8"?>
<xsl:stylesheet version="1.0" xmlns:xsl="http://www.w3.org/1999/XSL/Transform">

<xsl:template match="root">
   <xsl:element name="root">
      <xsl:element name="Window">
         <xsl:attribute name="id">MainWindow</xsl:attribute>
         <xsl:element name="Tabs">
            <xsl:attribute name="id">FunctionTabs</xsl:attribute>
            <xsl:attribute name="x">300</xsl:attribute>
            <xsl:attribute name="y">50</xsl:attribute>
            <xsl:attribute name="w">450</xsl:attribute>
            <xsl:attribute name="h">400</xsl:attribute>
            <xsl:for-each select="/root/Window[contains(@id,'FunctionWindow')]">
               <xsl:element name="Tab">

...

<xsl:for-each select="/root/Window[contains(@id,'FunctionWindow')]/ComboBox">
                     <xsl:element name="ComboBox">
                        <xsl:apply-templates select="@*|node()"/>
                     </xsl:element>
                  </xsl:for-each>
                  <xsl:for-each select="/root/Window[contains(@id,'FunctionWindow')]/EditBox">
                     <xsl:element name="EditBox">
                        <xsl:apply-templates select="@*|node()"/>
                     </xsl:element>
                  </xsl:for-each>
                  <xsl:for-each select="/root/Window[contains(@id,'FunctionWindow')]/Button">
                     <xsl:if test="Event/Action/text()!='ScreenChange'">
                        <xsl:element name="Button">
                           <xsl:apply-templates select="@*|node()"/>
                        </xsl:element>
                     </xsl:if>
                  </xsl:for-each>
               </xsl:element>
            </xsl:for-each>

...

</xsl:element>
      </xsl:element>
   </xsl:element>
</xsl:template>
```

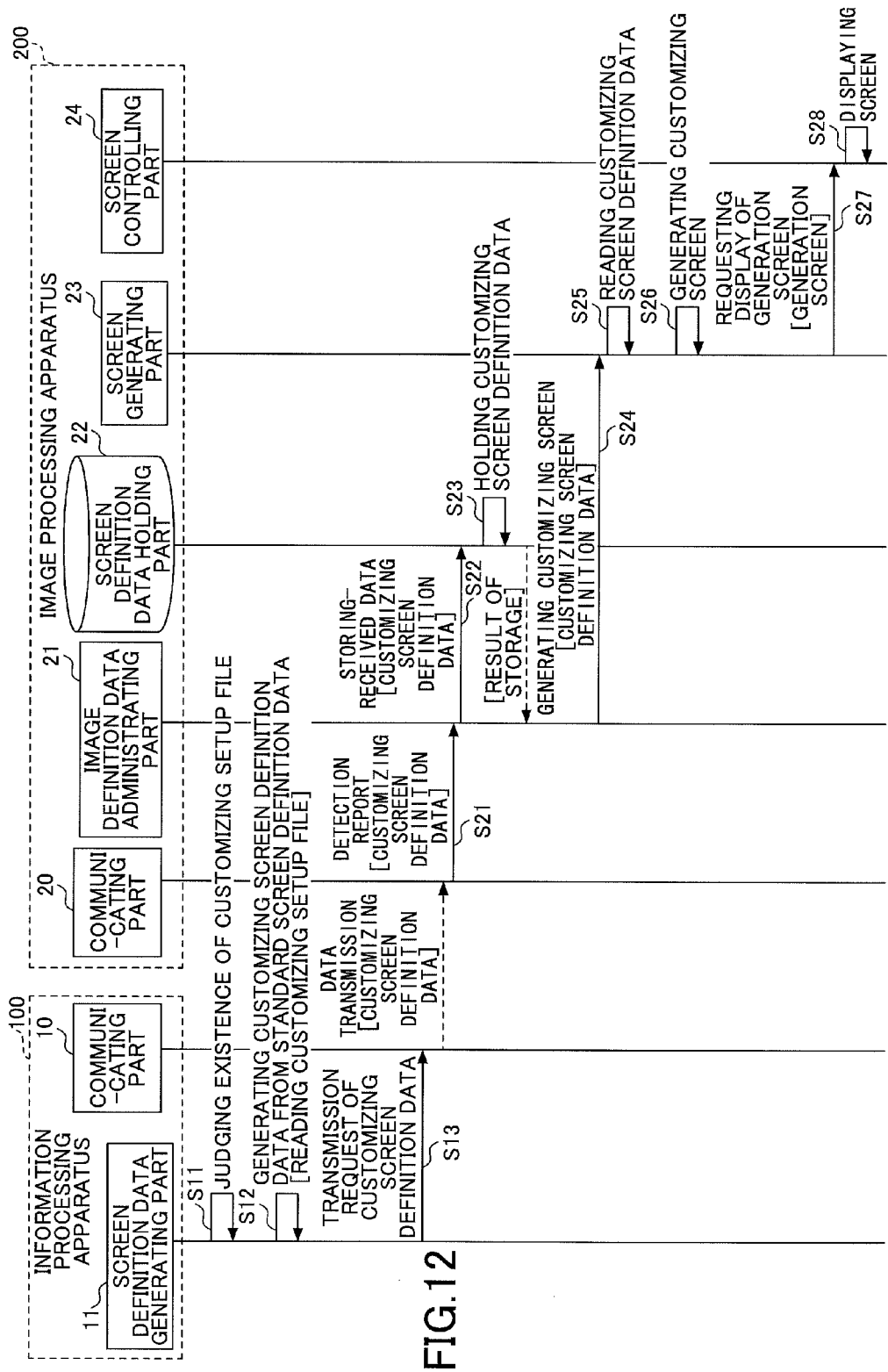

```
<Window id="MainWindow">
<Tabs id="Function Tabs" x="300" y="50" w="450" h="400">
</Tabs>
</Window>
```

FIG.14C

```
22De
<Window id="MainWindow">
 <Tabs id="Function Tabs" x="300" y="50" w="450" h="400">
  <Tab id="TabA" label="FUNCTION A">
   <ComboBox id="comboBoxA" label="SETUP A" x="50" y="50" w="350" h="100">
   .....
   </ComboBox>
  </Tab>
  <Tab id="TabB" label="FUNCTION B">
   <EditBox id="EditBoxB" label="SETUP B" x="50" y="50" w="350" h="100"/>
  </Tab>
 </Tabs>
 ┌──────────────────────────────────────────────────────────────────── R12
 │<RadioButton id="RadioButton1" label="SETUP 1" x="25" y="50" w="200" h="200">
 │ .....
 │</RadioButton>
 │<RadioButton id="RadioButton2" label="SETUP 2" x="25" y="300" w="200" h="200">
 │ .....
 │</RadioButton>
 └────────────────────────────────────────────────────────────────────
</Window>
```

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method, particularly to a technique of customizing a screen displayed on an image processing apparatus connected to the information processing apparatus.

2. Description of the Related Art

Information volumes displayed on display devices such as an operations panel of image processing apparatuses such as a multifunction peripheral (MFP) are increasing to diversify display contents. Therefore, there is user demand to customize display screens depending on users' authority and privileges.

Patent Document 1 discloses a technique of storing constitutional information of display components (graphic parts) to be displayed on an operations panel in a file and constituting a display screen based on a customized screen specification file.

However, an example of a screen customizing method merely customizes a single screen by changing a character array content, button positions or the like. Thus, it is impossible to integrally customize plural screens.

For example, an image processing apparatus has screens corresponding to plural installed functions, and transitions of the screens occur among the plural screens. Plural screens such as an action setup screen and an action request screen may be allocated to a single function. Screen transitions may occur among the plural screens.

Under this display circumstance, a user should carry out a setup operation via plural screens in providing action setup to, for example, an image processing apparatus. In order to reduce cumbersome operations, the user wishes to integrate these plural screens into a single screen by concentrating setups to plural screens on one screen.

However, in the example of the screen customizing method, it is not assumed to integrate the plural screens. Therefore, the user cannot customize a screen as desired. In order to automate integration of the plural screens in the example screen customizing method, logic of software for screen display installed in the image processing apparatus may be changed.

Patent Document 1: Japanese Laid-Open Patent Application No. 2008-167417

SUMMARY OF THE INVENTION

Accordingly, embodiments of the present invention provide a novel and useful information processing apparatus, an information processing system, and an information processing method solving one or more of the problems discussed above. More specifically, the embodiments of the present invention may also provide an information processing apparatus which can automatically customize the screen by integrating plural screens without changing the screen display software, an image processing apparatus connected thereto, an image processing system connected thereto, a screen customizing method thereof, a screen customizing program thereof and a recording medium storing the screen customizing program.

One aspect of the embodiments of the present invention may be to provide an information processing apparatus which is connected to an image processing apparatus having a display device via a predetermined data transmission line, the information processing apparatus including a data analyzing part configured to access a predetermined memory area which holds a plurality of definition data in the information processing apparatus and to analyze the definition data for a display content of screens to be integrated when the information processing apparatus receives an instruction to integrate a plurality of screens from a user; a data specifying part configured to specify data to be used for generating customizing screen definition data in which an integration display content of an integration screen is defined among the definition data based on an analysis result obtained by the data analyzing part; a generation part configured to generate the customizing screen definition data based on data specified by the data specifying part; and a communicating part transmitting the customizing screen definition data generated by the generation part to the image processing apparatus.

With this structure, the information processing apparatus of the embodiment can specify data for generating an integration screen from a result of analysis of various screen definition data of plural screens to be integrated. Said differently, the information processing apparatus does not simply integrate the plural screen definition data but data for integrating the screen are dynamically determined based on the content of the definition and extracted from the plural screen definition data. Subsequently, the information processing apparatus 100 generates customizing screen definition data from the specified data and transmits the generated customizing screen definition data to the image processing apparatus. As a result, the image processing apparatus displays a screen based in the received customizing screen definition data.

With this, in the information processing apparatus of the embodiment, the screen can be automatically customized by integrating plural screens without changing the screen display software. As a result, the user can customize the screen by integrating the plural screens into a single screen. Thus, it is possible to construct a useful operations environment. Further, a software developer does not need to do cumbersome work such as a software change even if it is requested to customize the screen by the user.

Another aspect of the embodiments of the present invention may be to provide an information processing method used in an information processing apparatus which is connected to an image processing apparatus having a display device via a predetermined data transmission line, the information processing method including accessing a predetermined memory area which holds a plurality of definition data in the information processing apparatus; analyzing the definition data for a display content of screens are to be integrated when the information processing apparatus receives an instruction to integrate a plurality of the screens from a user; specifying data to be used for generating customizing screen definition data in which an integration display content of an integration screen is defined among the definition data based on an analysis result obtained by the analyzing; generating the customizing screen definition data based on the specified data; and transmitting the customizing screen definition data generated by the generating to the image processing apparatus With this method, data for generating screen definition data of the integration screen are specified from a result of various screen definition data of plural screens to be integrated are specified. Customizing screen definition data are generated from the specified data. Then, the generated customizing screen definition data is transmitted to an image processing apparatus.

With this, in the information processing method of the embodiment, the screen can be automatically customized by integrating plural screens without changing the screen display software.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrate an example screen definition data of a function selecting screen of Embodiment 1.

FIG. 7A and FIG. 7B illustrate example screen definition data of function setup screens of Embodiment 1.

FIG. 10 illustrates example customized screen definition data of Embodiment 1.

FIG. 11 illustrates example data of a customizing setup file of Embodiment 1.

FIG. 12 is a sequence chart illustrating an example screen customizing procedure of Embodiment 1.

FIG. 14A, FIG. 14B and FIG. 14C illustrate data transition examples in generating customizing screen definition data of Embodiment 1.

DETAILED DESCRIPTION OF THE PREFERRED EMBODIMENTS

A description is given below, with reference to the FIG. 1 through FIG. 18 of embodiments of the present invention.

Reference symbols typically designate as follows:
1: image processing system;
10: communicating part of information processing apparatus;
11: screen definition data generating part;
111: data analyzing part;
20: communicating part of image processing apparatus;
21: image definition data administrating part;
201: customized data existence judging part;
22: screen definition data holding part
22Ds: standard data;
22De: customized data;
23: screen generating part;
24: screen controlling part;
31D: customizing setup file;
100: information processing apparatus;
101: input device;
102: display device;
103: drive device;
103a: recording medium;
104: RAM (volatile semiconductor memory);
105: ROM (non-volatile semiconductor memory);
106: CPU (processing device);
107: interface device;
NIC: Network I/F Card;
108: HDD (non-volatile memory device);
200: image processing apparatus;
210: controller (controlling board);
211: memory device;
212: CPU (processing unit);
213: network I/F;
214: external memory I/F;
214a: recording medium;
220: operations panel (input and display device);
230: plotter (printing device);
240: scanner (reading device);
300: screen managing apparatus (screen managing server);
B: bus;
N: data transmission line; and
W: display screen (operations screen).

Embodiment 1

<System Structure>

Figure 1:
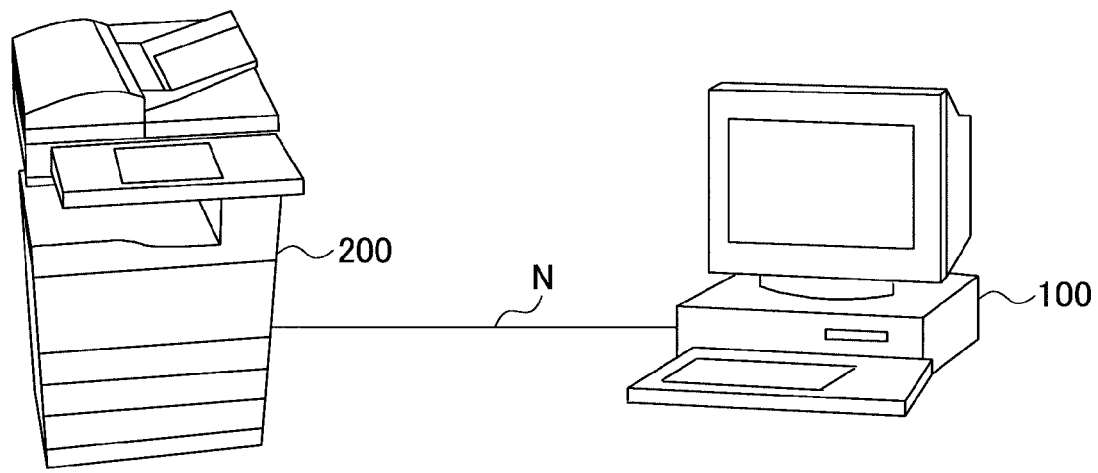
FIG. 1 illustrates a structural example of an image processing system of Embodiment 1.

FIG. 1 illustrates a structural example of an image processing system of Embodiment 1. FIG. 1 illustrates an example system structure in which an image processing apparatus 200 and an information processing apparatus 100 are connected by a data transmission line N such as Local Area Network (LAN).

The image processing apparatus 200 has an image processing function. The image processing function may be reading an original document (manuscript) or printing. On the other hand, the information processing apparatus 100 requests the image processing apparatus 200 to perform image processing.

With this, a user can use the following image processing service. For example, the user can transmit print data from the information processing apparatus 100 to the image processing apparatus 200 and acquire a printed result. The user can read the original document with the image processing apparatus 200 and acquire the read image by the information processing apparatus 100 accessing the image processing apparatus 200.

As described, the image processing system 1 can remotely provide an image processing service with the above system structure. The image processing system 1 may include plural information processing apparatuses 100 and plural image processing apparatuses.

<Hardware Structure>

The hardware structure of the information processing apparatus 100 and the image processing apparatus 200 of Embodiment 1 is described.

<Information Processing Apparatus>

Figure 2:
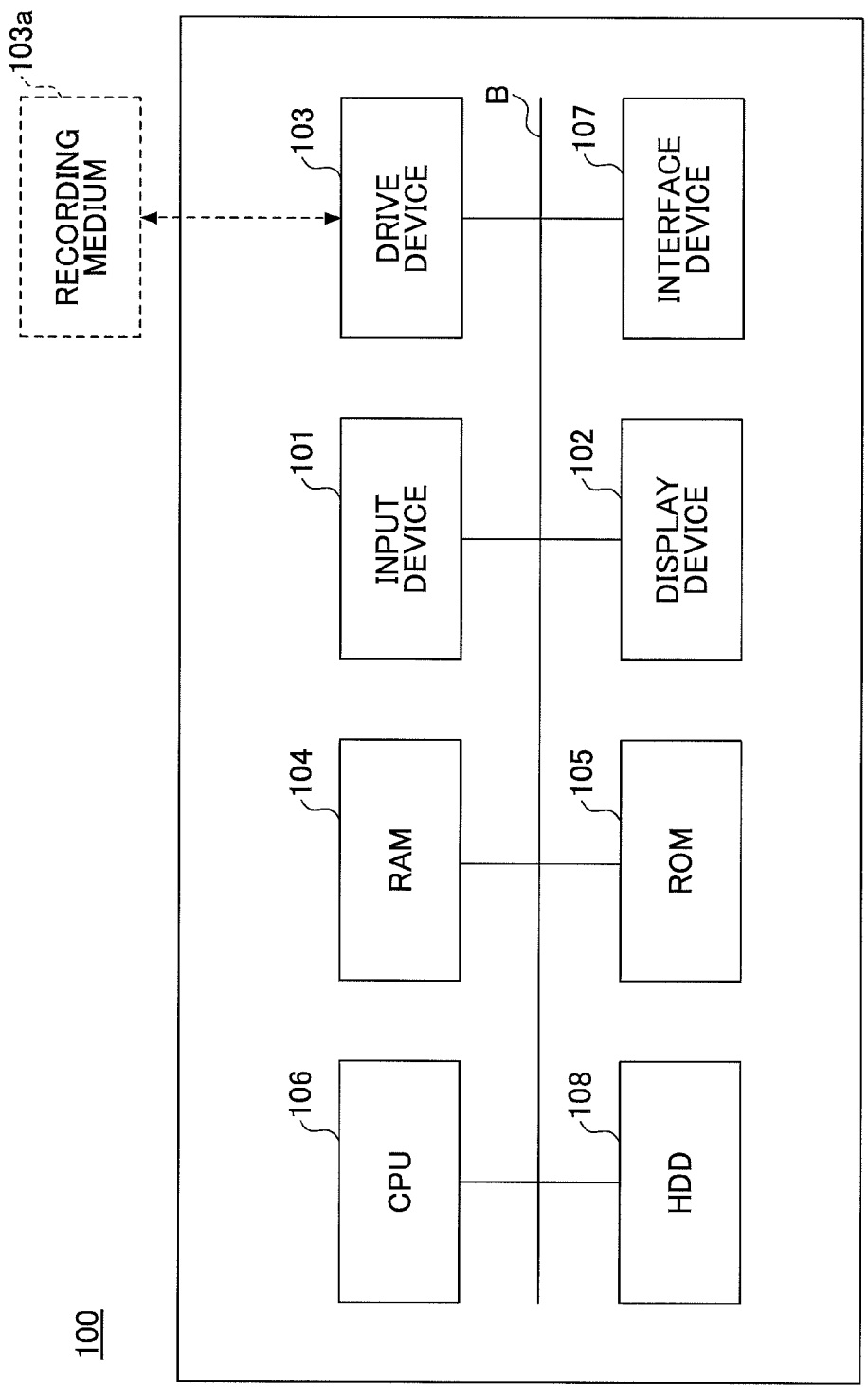
FIG. 2 illustrates a hardware structural example of the information processing apparatus of Embodiment 1.

FIG. 2 illustrates a hardware structural example of the image processing apparatus 100 of Embodiment 1. Referring to FIG. 2, the information processing apparatus 100 includes an input device 101, a display device 102, a drive device 103, a random access memory (RAM) 104, a read only memory 105, a central processing unit (CPU) 106, an interface device 107, and a hard disk drive (HDD) 108, which are mutually connected via a bus B.

The input device 101 may include a keyboard and a mouse used to input various operation signals to the information processing apparatus 100. The display device 102 includes a display or the like to display a processing result obtained by the information processing apparatus 100.

The interface device 107 is an interface for connecting the information processing apparatus 100 to the data transmission line N. With this, the information processing apparatus 100 carries out data communication with the image processing apparatus 200 and other information processing apparatuses 100 via the interface device 107.

The HDD 108 is a non-volatile memory device storing various programs and data. The stored programs and data may be an information processing system controlling an entire information processing apparatus, namely an Operating System (OS) being basic software such as "Windows" and "UNIX", ("Windows" and "UNIX" are registered trademarks), and an application providing various function (for example, "screen customizing function") on the information processing system. The HDD 108 manages the stored program and data with a predetermined file system and/or a database (DB).

The drive device 103 is an interface with a detachable recording medium 103a. With this, the information processing apparatus 100 can read or write information via a drive device 103. The recording medium 103a may be a floppy disc ("floppy" is a registered trademark), a Compact Disc (CD), a digital versatile disk (DVD), or the like.

The ROM 105 is anon-volatile semiconductor memory (memory device) which can hold internal data even when the non-volatile semiconductor memory is powered off. The ROM 105 stores programs and data such as Basic Input/Output System (BIOS), information processing system setup, network setup or the like which are executed at a time of starting up the information processing apparatus 100. RAM 104 is a volatile semiconductor memory (memory device) temporarily storing programs and data. CPU 106 reads programs and data from a memory device such as the HDD 108 and the ROM 105 to the RAM 104. By carrying out the processes with the CPU 106, the entire information processing apparatus can be controlled and functions installed in the information processing apparatus are realized.

As described, the information processing apparatus 100 of Embodiment 1 can provide various information processing services with the hardware structure.

<Image Processing Apparatus>

Figure 3:
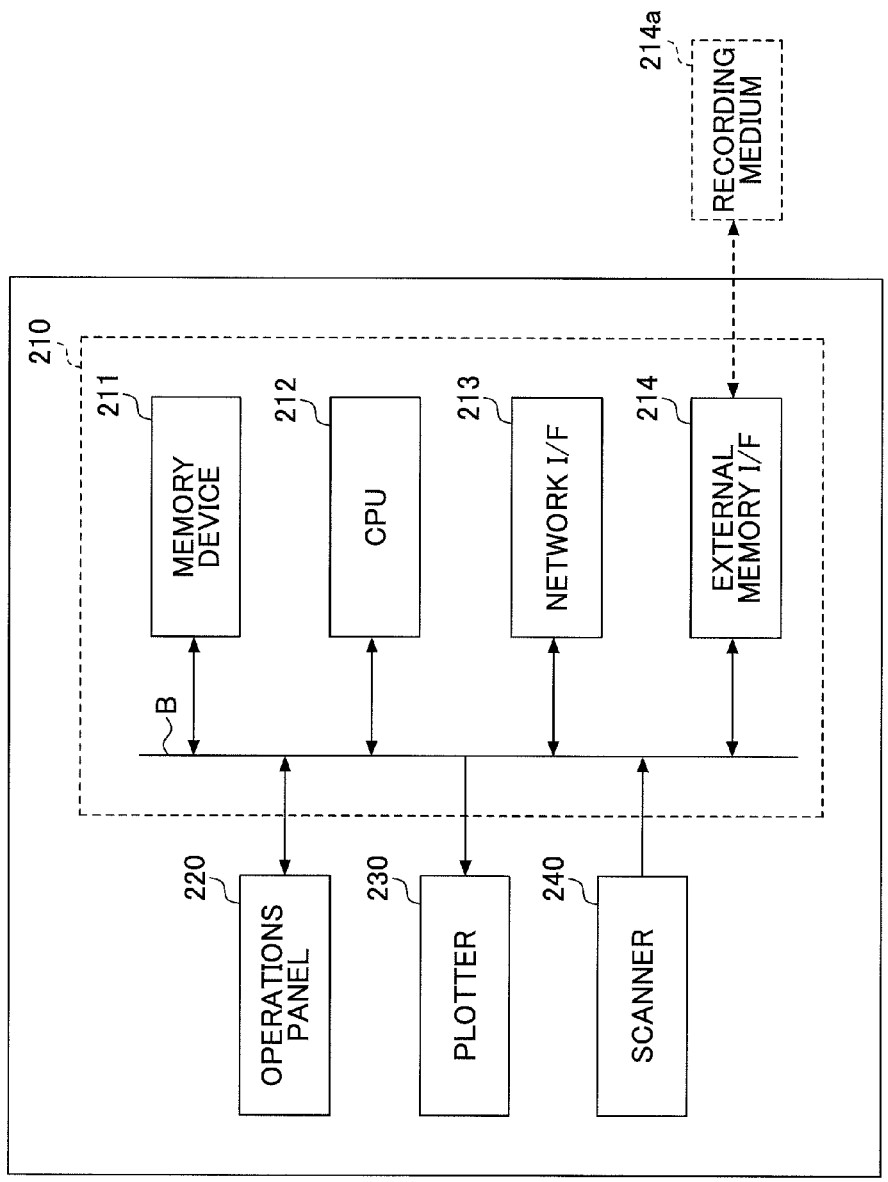
FIG. 3 illustrates a hardware structural example of an image processing apparatus of Embodiment 1.

FIG. 3 illustrates an example hardware structure of the image processing apparatus 200 of Embodiment 1. Referring to FIG. 3, the image processing apparatus 200 includes a controller 210, an operations panel 220, a plotter 230, and a scanner 240, which are mutually connected via a bus B.

The operations panel 220 includes an input portion and a display portion, provides various information items such as apparatus information, and receives various user operations such as action setup and action instructions. Thus, the operations panel 220 functions as input and display device. The plotter 230 includes an image forming unit for forming an output image on a paper. For example, a system of forming an output image may be an electrophotographic system and an inkjet system. The scanner 240 optically reads the original document and produces read image data.

The controller 210 includes a CPU 212, a memory device 211, a network I/F 213, and an external memory I/F 214, which are mutually connected via the bus B.

The memory device 211 includes a RAM, a ROM and an HDD, and stores, holds, or stores and holds various programs and data. The CPU 212 reads the programs and data into the RAM from the ROM or the HDD and carries out processes (processing of the programs and data read out of the memory device). Thus, the CPU 212 controls the entire image processing apparatus 200 and realizes functions installed in the image processing apparatus 200.

The interface device 213 is an interface for connecting the information processing apparatus 200 to the data transmission line N. The external memory I/F 214 is an interface for a recording medium 214a being an external memory device. The recording medium 214a may be an SD memory card, a universal serial bus (USB) memory, or the like. With this the image processing apparatuses 200 can read, write, or read and write information from the recording medium 214a via the external memory I/F 214.

As described, the image processing apparatus 200 can provide various image processing services with the above hardware structure.

<Screen Customizing Function>

A screen customizing function of embodiment 1 is described. With the image processing system 1 of Embodiment 1, the following processes are associated by the information processing apparatus 100 and the image processing apparatus 200 to thereby realize the screen customizing function. The information processing apparatus 100 analyzes screen definition data of plural screens to be integrated. Subsequently, the information processing apparatus 100 specifies data for producing screen definition data (customizing screen definition data) among data contained in the screen definition data based on an analyzing result (definition data such as a screen type, a display component, a transition event, or any or all of the screen type, the display component and the transition event, which is obtained by the analysis). Said differently, the information processing apparatus does not simply integrate the plural screen definition data but data for integrating the screen are dynamically determined based on the content of the definition and extracted from the plural screen definition data. Subsequently, the information processing apparatus 100 produces the customizing screen definition data based on the specified data. As a result, the information processing apparatus 100 transmits the produced customizing screen definition data to the image processing apparatus 200. The image processing apparatus 200 displays the screen based on the received customizing screen definition data. The image processing system 1 includes the screen customizing function.

With the example screen customizing method, when a user wishes to carry out an action setup of the image processing apparatus 200 ordinarily carried out by the plural setup screens by a single setup screen, the plural setup screens are not aggregated or integrated into a single screen. In order to automate the integration of the plural screens in the example screen customizing method, logic of software for screen display installed in the image processing apparatus 200 may be changed.

As described, the example screen customizing method is not convenient for the user, and a software developer is forced to do cumbersome work.

With the image processing system 1 of Embodiment 1, data for integrating the screen definition data of the plural screens to be integrated are automatically extracted based on the definition data such as the screen type, the display component, the screen transition event, or any or all of the screen type, the display component and the screen transition event, which are obtained by the data analysis. Then, the customizing screen definition data are produced.

With this, in the image processing system of Embodiment 1, the screen can be automatically customized by integrating plural screens without changing the screen display software. As a result, the user can customize the screen as desired to thereby realize a convenient operations environment. The software developer can enjoy reduced workload for screen customizing.

Figure 4:
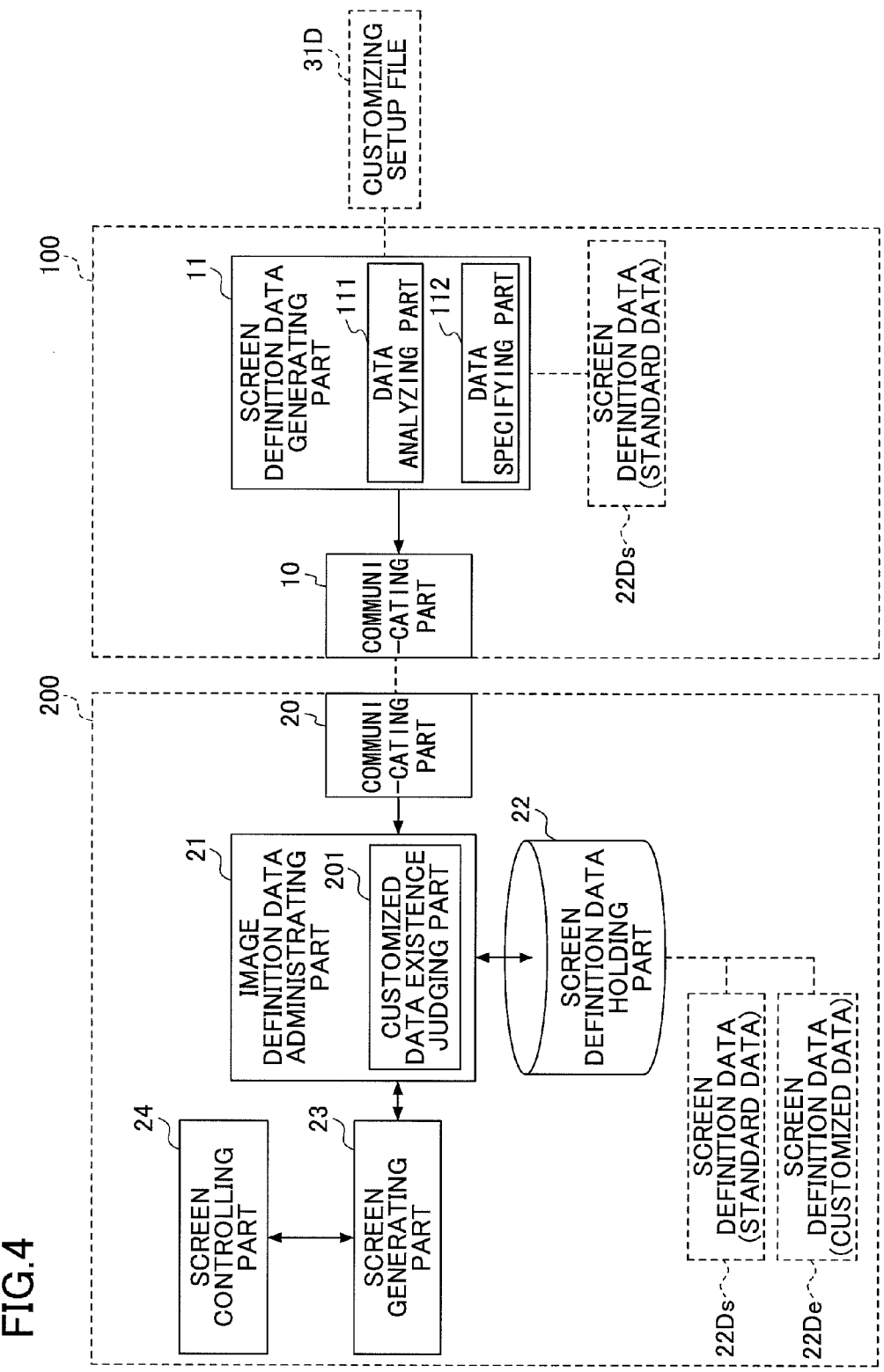
FIG. 4 illustrates a structural example of screen customizing function of Embodiment 1.

Hereinafter, a structure of the screen customizing function and an action of the screen customizing function related to Embodiment 1 are explained. FIG. 4 illustrates an example structure of the screen customizing function of Embodiment 1. The image processing system 1 of Embodiment 1 includes a screen definition data generating part 11, a screen definition data administrating part 21, a screen generating part 23 and a screen controlling part 24.

The screen definition data generating part 11 is a function unit of the information processing apparatus 100. The screen definition data administrating part 21, the screen generating part 23 and the screen controlling part 24 are function units of the image processing apparatus 200. Hereinafter, the image processing apparatus 200 and the information processing apparatus 100 are described in this order.

<Function Unit Included in the Image Processing Apparatus>

The image definition data administrating part 21 is a function unit managing screen definition data 22Ds before customizing the screen (hereinafter, referred to as standard screen definition data 22Ds) and screen definition data 22De after customizing the screen (hereinafter, referred to as customizing screen definition data 22De). The standard screen definition data 22Ds and the customizing screen definition data 22De are collectively named screen definition data 22D.

These screen definition data 220 may be stored and held by a screen definition data holding part 22 corresponding to a predetermined memory area of the memory device 211 installed in the image processing apparatus 200. The image definition data administrating part 21 accepts a data operations request from another functional unit. Then, the image definition data administrating part 21 accesses the screen definition data holding part 22 and carries out the requested data operation to manage the screen definition data. The data operation requested from the other function unit may be acquisition (reading) and recording (storing or holding) of the screen definition data. The screen definition data 22Ds are held in the screen definition data holding part 22 in correspondence with a display screen W related to installed function of the image processing apparatus 200. The customizing screen definition data 22De are received via the communicating part 20 after carrying out the screen customizing process in the information processing apparatus described later, and recorded in the screen definition data holding part 22 with the screen definition data administrating part 21.

Figure 5:
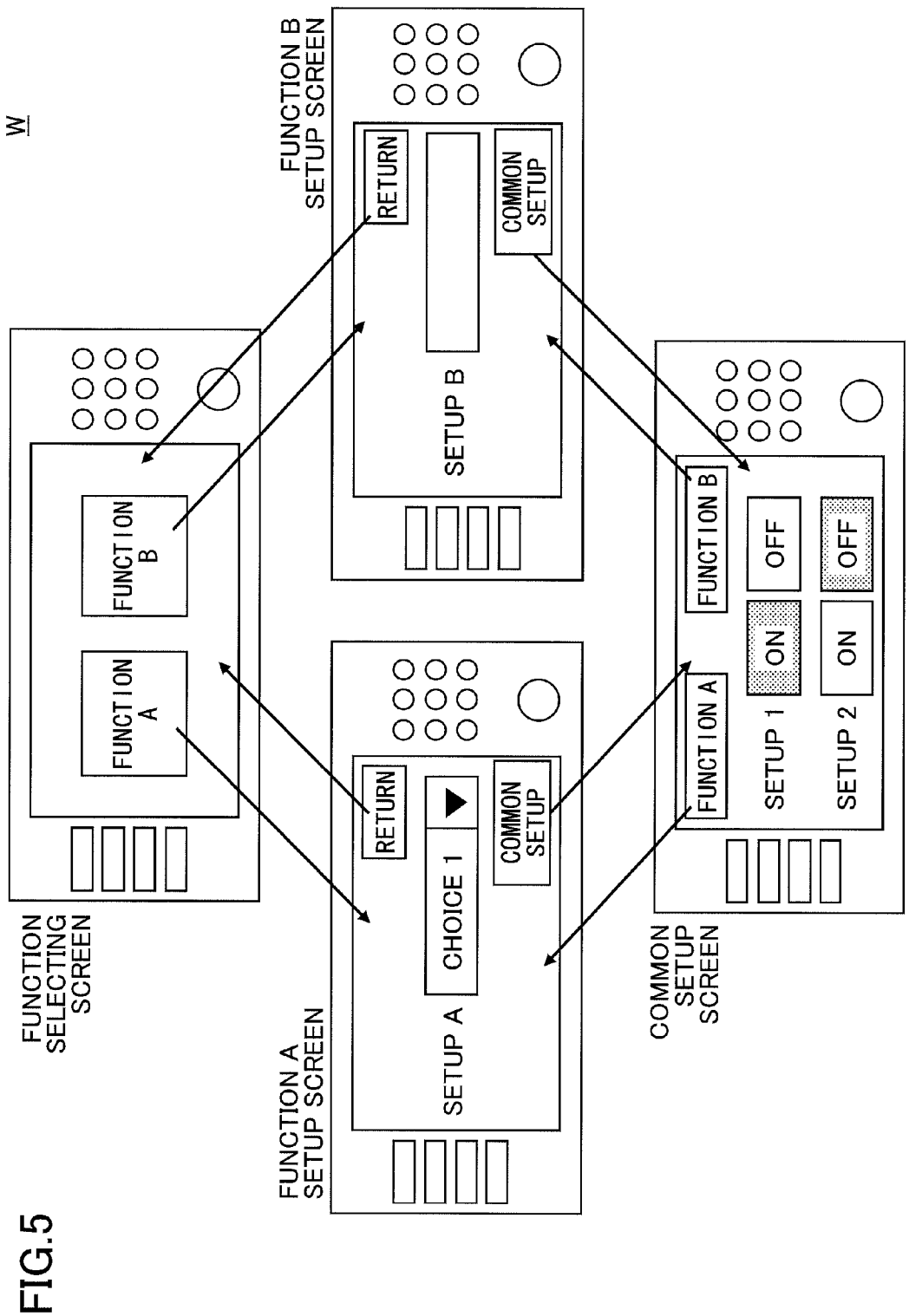
FIG. 5 illustrates an example screen to be integrated according to Embodiment 1.

The screen definition data 22D are explained. FIG. 5 illustrates example screens of Embodiment 1 to be integrated. FIG. 5 illustrates example plural display screens to be displayed when setup operations of function A and function B are carried out in the image processing apparatus 200.

Referring to FIG. 5, the display screens W may include a function selecting screen for selecting the function A and the function B, a setup screen of the function A, a setup screen of the function B, and a setup screen common to the function A and the function B. For example, the display screens W transit along arrows in FIG. 5.

Figure 7A:
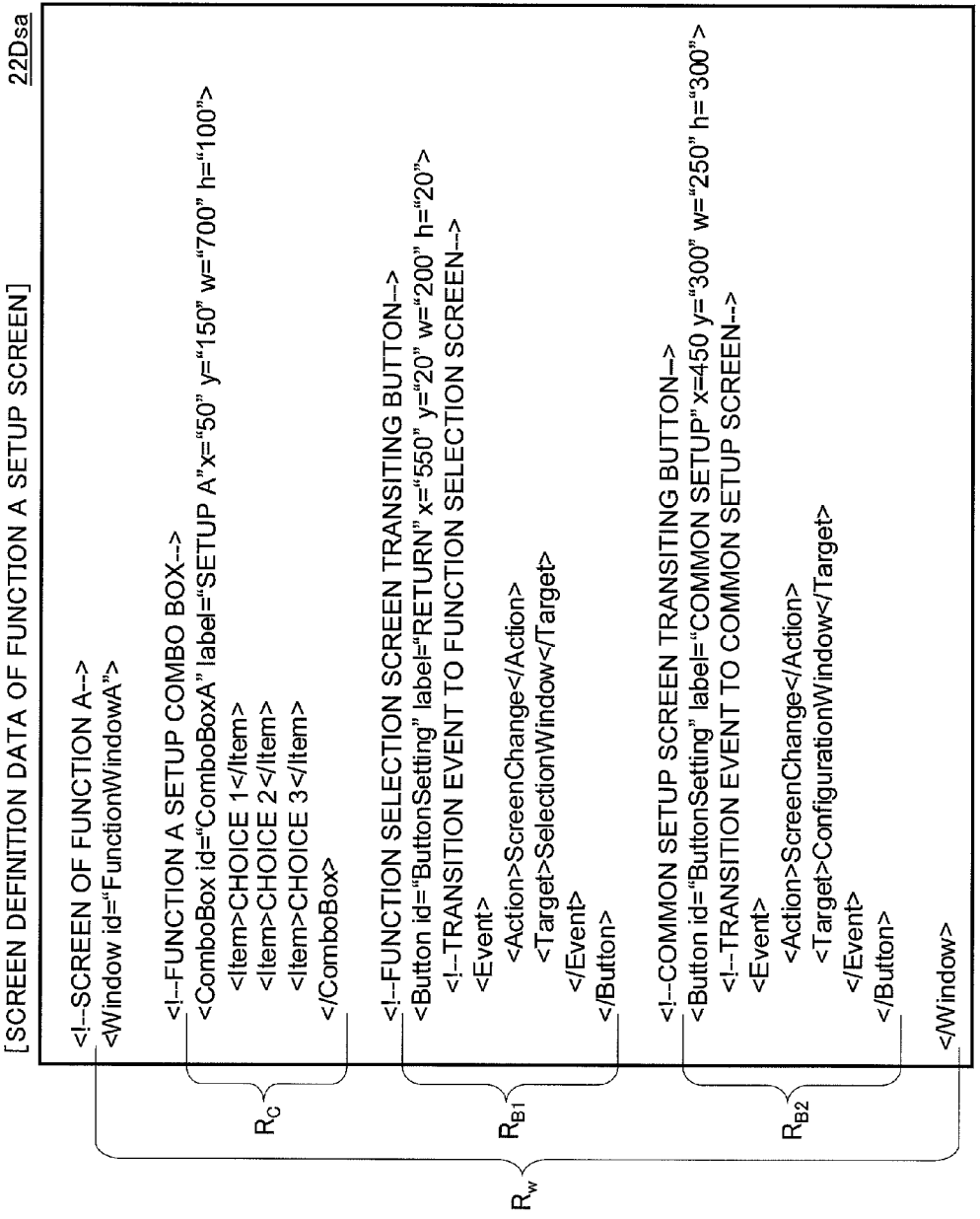
Figure 8:
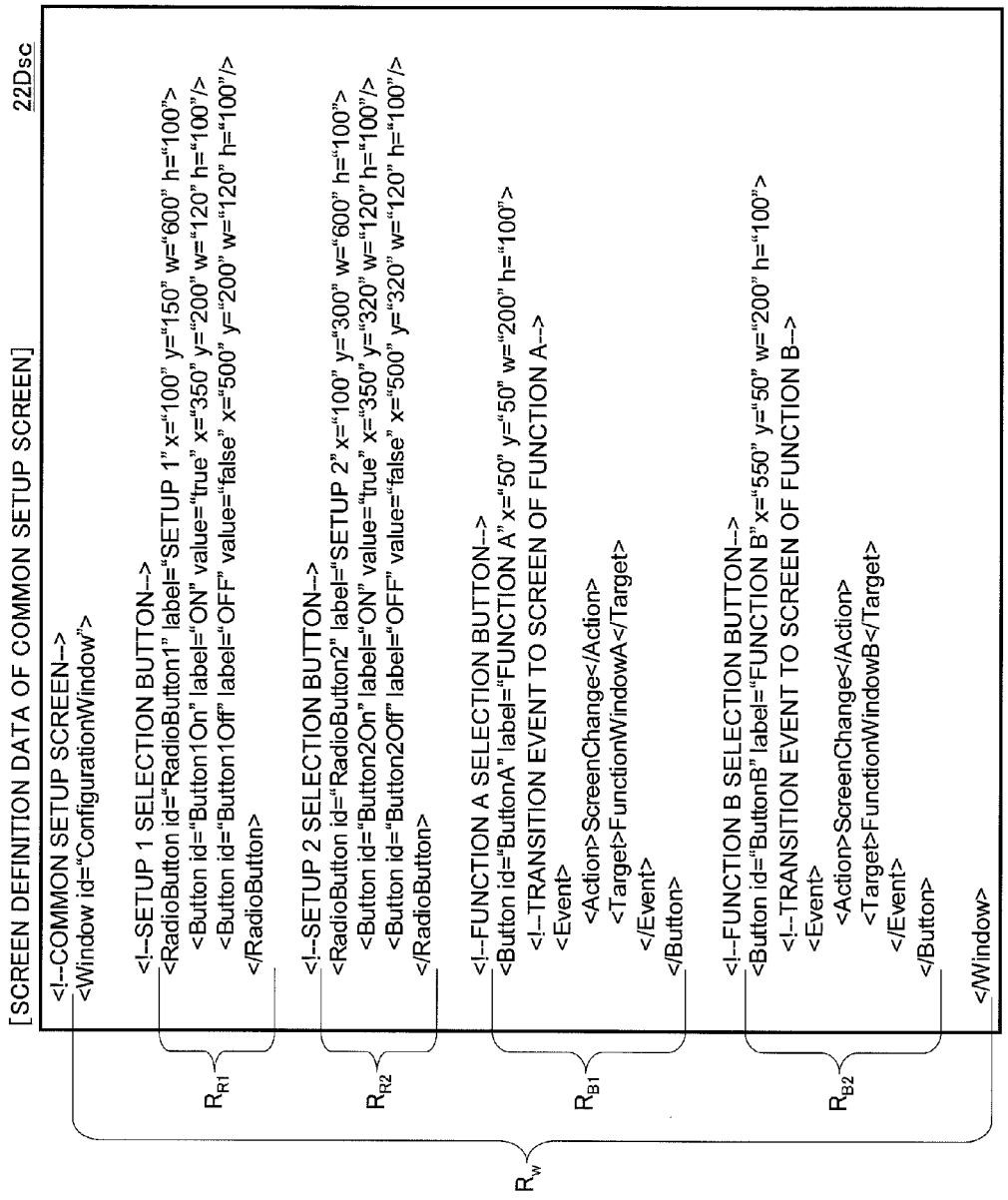
FIG. 8 illustrates example screen definition data of a common setup screen of Embodiment 1.

The display screens W may be defined to have display contents with the screen definition data such as data illustrated in FIG. 6 to FIG. 8 and stored as the screen definition data 22Ds in the screen definition data holding part 22.

FIG. 6 illustrates screen definition data 22Dss of the function selecting screen illustrated in FIG. 5. FIG. 7A and FIG. 7B respectively illustrate screen definition data 22Dsa and 22Dsb of the function setup screen illustrated in FIG. 5. FIG. 8 illustrates screen definition data 22Dsc of the common setup screen illustrated in FIG. 5. As illustrated in FIG. 6 to FIG. 8, the screen definition data 22D are defined to have a display content in conformity with a predetermined data type. The display content defined by the screen definition data 22D may include a screen type, a display component, and a screen transition event. As described, the screen definition data 22D have a structure in which one or plural definition data defining the display content are assembled.

FIG. 6 to FIG. 8 illustrate an example screen definition data of an Extensible Markup Language (XML) type. A markup language such as XML may be used because data having unique meaning or structure is enabled to be easily produced although a data form is unified using tags. Data surrounded by the same kind of tags have one meaning in the XML data. One or more tag data may be inserted in the tag data. A hierarchical structure may be expressed with the data structure. With this, the tag data become definition data defining the screen type, the display component and the screen transition of the screen definition data 22D of the XML type.

For example, the screen definition data 22Dss of the function selecting screen illustrated in FIG. 6 defines the contents of the display screen selecting the function A and the function B using a Window tag, a Button tag, an Event tag, an Action tag, and a Target tag. The screen definition data 22Dss are definition data $R_w$ using the Window tag, in which the function selecting screen including an attribute value of the screen type is defined. Buttons which are defined by the definition data $R_{B1}$ and $R_{B2}$ formed by using two Button tags and provided to select the function A and the function B including the attribute value of the display component are defined in the Window tag. Further, operation event actions to be done when the function A and the function B are defined by definition data RE1 and RE2 using the Event tags are defined in the Button tags, respectively. Screen transition instructions are defined by Action tags in the Event tags, and screen transition destinations are defined by Target tags in the Event tags.

With this, the image processing apparatus 200 analyzes the tags of the screen definition data 22Dss and controls the screen to display the selection screen received with the selection event, carry out the screen transition action after receiving the selection event based on the obtained definition data $R_W$, $R_B$ and $R_E$ (hereinafter, collectively referred to as definition data R). The image processing apparatus 200 displays the function selecting screen illustrated in FIG. 5 and controls the screen based on the screen definition data 22Dss.

Referring back to FIG. 4, the screen generating part 23 is a function unit which generates the display screen based on the screen definition data 22D. When the screen generating part 23 receives a screen generating request using the installed function of the image processing apparatus 200, the screen generating part 23 requests the screen definition data administrating part 21 to acquire the data by designating the screen definition data 22D. As a result, the image definition data administrating part 21 accesses the screen definition data holding part 22 and returns the acquired data to the screen generating part 23. The screen generating part 23 analyzes the acquired screen definition data 22D and generates the requested screen based on the definition data R.

As described, the screen definition data holding part 22 after customizing the screen holds the standard screen definition data 22Ds and the customizing screen definition data 22De. In this case, the image definition data administrating part 21 gives the customizing screen definition data 22De of the display screen W desired by the user to the screen generating part 23. On the other hand, while the screen is not customized, the standard screen definition data 22Ds is given to the screen generating part 23. Therefore, the image definition data administrating part 21 has the function unit for confirming an existence of the customized data in order to control a selection between the standard screen definition data 22Ds and the customizing screen definition data 22De to be returned to the screen generating part 23. The function unit of the image definition data administrating part 21 is a customized data existence judging part 201.

The customized data existence judging part 201 accesses the screen definition data holding part 22D and determines whether customized data of the screen definition data 22D exists. The image definition data administrating part 21 returns the customizing screen definition data 22De to the screen generating part 23 when it is determined that the customized data exist. On the other hand, when it is determined that the customized data do not exist, the image definition data administrating part 21 returns the standard screen definition data 22Ds to the screen generating part 23. As described, the screen definition data administrating part 21 controls a response of the screen definition data 22D to the screen generating part 23 by the customized data existence judging part 201. The customized data existence judging part 201 may determine whether there are customized data based on a file name, data updating date and so on. When the standard data and the customized data are held in different memory areas such as different directories and different holders, only the memory area holding the customized data may be referred to in order to determine the existence of the data.

The screen controlling part 24 is a function unit controlling screen display on the operations panel 220 included in the image forming apparatus 200. The screen controlling part 24 may display the screen generated by the screen generating part 23 on the operations panel 220. The screen controlling part 24 requests the screen generating part 23 to generate a new screen (a screen to be transited) when the screen controlling part 24 receives an operation event from the display screen W.

<Function Unit Included in the Information Processing Apparatus>

The screen definition data generating part 11 is a function unit which generates the customizing screen definition data De obtained by integrating or aggregating plural standard screen definition data 22Ds for the display screen W to be integrated. The screen definition data generating part 11 functions by causing a screen customized tool having Graphical User Interface (GUI) function to act in the information processing apparatus 100. The screen customizing tool holds standard screen definition data 22Ds corresponding to the display screen W of the image processing apparatus 200. Therefore, the user can designate plural display screens W to be integrated via the GUI of the screen customizing tool. The display screen W of the image processing apparatus 200 may be displayed on the screen of the display device 102 included in the information processing apparatus 100 based on the standard screen definition data 22Ds.

With this, the user can designate plural standard screen definition data 22Ds for customizing the screen. The screen definition data generating part 11 carries out the following processes based on the plural standard screen definition data 22Ds and generates customizing screen definition data (screen definition data of the integration screen) 22De desired by the user.

The screen definition data generating part 11 searches inside the plural standard screen definition data designated as an object to be integrated using tags and analyzes this data. As a result of the analysis, the screen definition data generating part 11 acquires definition data R such as a screen type, a display component and a screen transition event. Thereafter, the screen definition data generating part 11 specifies data for generating the customizing screen definition data 22De out of data included in the standard screen definition data 22Ds with the data specifying part 112 of the screen definition data generating part 11 based on the result of the analysis. Specifically, the data generating the customizing screen definition data 22De are specified based on various tag descriptions and attribute values defining the screen type, the display component and the screen transition event.

Figure 9:
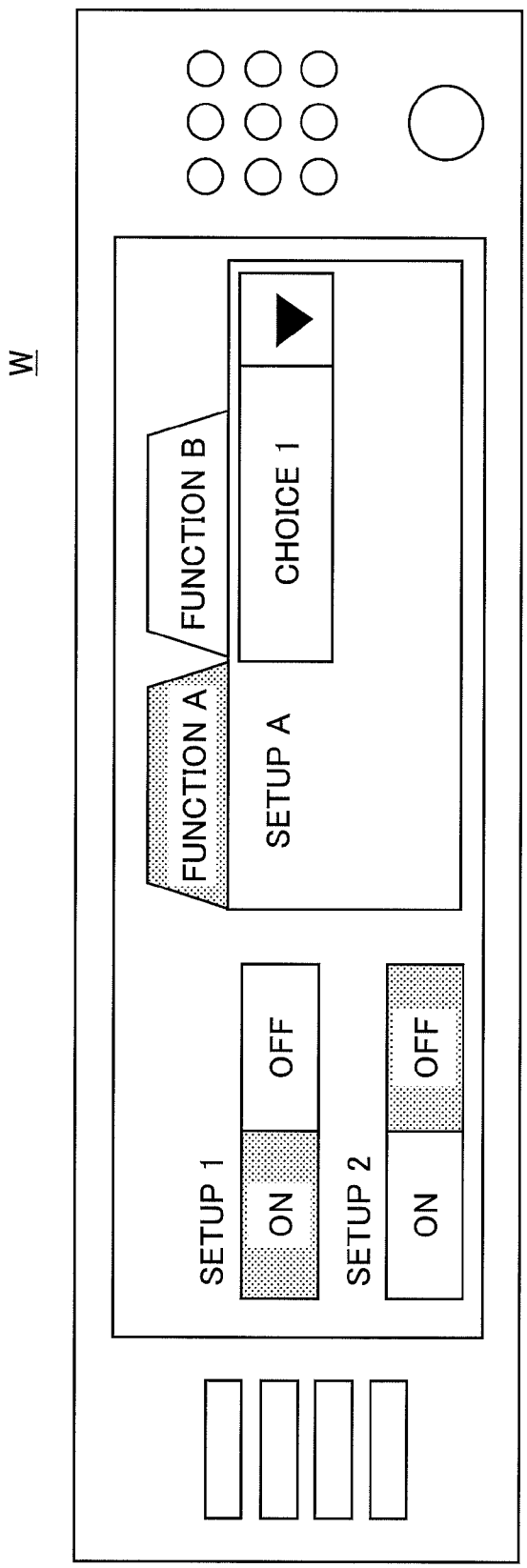
FIG. 9 illustrates an example customized display screen (integration screen) of Embodiment 1.

FIG. 9 illustrates an example display screen (integration screen) after customizing the display screen. FIG. 9 illustrates an example display screen W in which a setup screen which is changeable among functions and a setup screen commonly used for the various functions are integrated as one screen. For example, in this customization of the screens, the data analyzing part 111 analyzes the plural standard screen definition data 22Dss, 22Dsa, 22Dsb and 22Dsc illustrated in FIG. 6 to FIG. 8. As the result of the analysis, the definition data such as the screen type, display component, and the screen transition event included in the standard screen definition data 22Ds are obtained. At this time, the data analyzing part 111 holds the obtained definition data R in a memory for each analyzed standard screen definition data.

The data specifying part 112 gradually specifies (extracts) data for generating the screen definition data among the obtained definition data R in conformity with a predetermined condition (predetermined search condition).

The data specifying part 112 specifies definition data $R_w$ of which attribute value (id value of Window tag) of screen type definition is "FunctionWindow" or "ConfigurationWindow" among the plural definition data R. As a result, various definition data $R_w$ of standard screen definition data 22Dsa, 22Dsb and 22Dsc illustrated in FIG. 7A, FIG. 7B and FIG. 8 are specified in Embodiment 1. These definition data $R_w$ are specified as definition data (standard screen definition data) R including data for generating the customizing screen definition data 22De. Therefore, the definition data corresponding to the standard screen definition data 22Dss (standard screen definition data which do not correspond) are removed from the memory.

Subsequently, the data specifying part 112 classifies the specified data $R_w$ into definition data $RD$, of which attribute value (id value such as EditBox tag, Button tag, ComboBox tag and RadioButton tag) defining the display component is "Button" and definition data $R_{DB}$, $R_C$ and $R_R$, of which definition value is not "Button". The data specifying part 112 specifies data for generating the screen definition data with different methods among the classified definition data $R_B$ and the other definition data $R_{DB}$, $R_C$ and $R_R$ which are classified.

For example, the classified definition data R is defined by the "Button" tag, the data specifying part 112 specifies definition data, of which definition value (Action tag data inside Event tag) is not "ScreenChange", as data necessary for the generation of the screen definition data. However, definition data, of which definition value (Action tag data inside Event tag) is "ScreenChange", is determined as data unnecessary for the generation of the screen definition data. This is because the attribute value "ScreenChange" defines a screen transition action when a button is pushed to select the user and the screen does not transit after the screen is customized (integrated) as illustrated in FIG. 9. The attribute value "ScreenChange" defines the screen transition action when the button is pushed for selecting the user. As illustrated in FIG. 9, the screen does not transit after customizing or integrating the screen.

On the other hand, the data specifying part 112 specifies the definition data RDB, RC and RR defined by the EditBox tag, the ComboBox tag and the RadioButton tag as data for generating the screen definition data. As a result, in Embodiment 1, the definition data $R_C$ of the standard screen definition data 22Dsa illustrated in FIG. 7A, the definition data $R_{DB}$ of the standard screen definition data 22Dsb illustrated in FIG. 7B, and the definition data $R_R$ of the standard screen definition data 22Dsc illustrated in FIG. 8 are specified.

As described, the data specifying part 112 determines whether the display components require the screen transition in selecting the user based on the attribute values of the display component, the screen transition event, or both the display component and the screen transition event, which are included in the definition data $R_B$, $R_{DB}$, $R_C$ and $R_R$. As a result, the data specifying part 112 specifies the definition data $R_{DB}$, $R_C$ and $R_R$ defining the display component which does not cause the screen transition as the data for generating the customizing screen definition data 22De based on the result of the determination.

The screen definition data generating part 11 dynamically specifies the data for integrating the screen definition data from the standard screen definition data 22Ds with the above process and generates the customizing screen definition data defining the display screen after the integration based on the specified data. Said differently, the screen definition data generating part 11 does not merely integrate the plural standard screen definition data 22Ds with, for example, data chaining.

FIG. 10 illustrates example screen definition data which are customized in Embodiment 1. The screen definition data generating part 11 generates the customizing screen data definition data 22De illustrated in FIG. 10 based on the definition data R specified as described above.

The screen definition data generating part 11 first generates definition data R1, in which an attribute value of screen type is defined such that an id value of the Window tag is "MainWindow". Subsequently, the screen definition data generating part 11 generates definition data R11, in which an attribute value of a function integration screen is defined such that an id value of the Tabs tag is "FunctionTabs", and inserts the definition data R11 into the definition data R1.

Subsequently, the screen definition data generating part 11 generates definition data R11a and R11b, in which attribute values of function screens are defined such that id values of the Tabs tag are "TabA" and "TabB", and the label values of the TAb tag are "function A" and "function B" based on the definition data $R_{DB}$ and $R_C$ specified from the standard screen definition data 22Dsa and 22Dsb of a function A setup screen and a function B setup screen in the data specifying process, and inserts the definition data R11a and R11b into the definition data R11. Said differently, the screen definition data generating part 11 inserts the definition data R11a and R11b at positions in lower hierarchies than that of the definition data R11. Further, the screen definition data generating part 11 inserts the definition data R11 of the function screen in conformity with the number of the definition data $R_{DB}$ and $R_C$ which are specified by the data specifying process.

Subsequently, the screen definition data generating part 11 generates the definition data for a screen commonly used for the function A and the function B based on the definition data $R_R$ specified from the standard screen definition data 22Dsc of a common setup screen in the data specifying process and inserts the definition data R12 into the definition data R1 at a position in the same hierarchy as that of the definition data R11.

FIG. 11A and FIG. 112 illustrate example data of customizing setup file 31D of Embodiment 1.

The screen definition data generating part 11 adjusts various attribute values (e.g., x, y, w and h) of positions, sizes or the like of the display components to be values corresponding to the size of the display screen W at, a time of generating the customizing screen definition data 22De. At this time, the screen definition data generating part 11 determines attribute values based on, for example, various setup values of the customizing setup files 31D illustrated in FIG. 11A and FIG. 11B.

FIG. 11A and FIG. 11B illustrate two types of the customizing setup file 31D. FIG. 11A illustrates the customizing setup file 31D of XML type. FIG. 11B illustrates the customizing setup file 31D of Extensible Stylesheet Language (XSL) type. For example, the screen definition data generating part 11 reads the customizing setup file 31D and carries out data analysis. Thereafter, based on the analysis result, an attribute value of the display component is determined and the customizing screen definition data De are generated.

When the customizing setup file 31D is a text file illustrated in FIG. 11, the user describes various setup values using a predetermined text editor to generate the text file. The customizing setup file 31D may be a file generated by another information processing apparatus. The screen definition data generating part 11 may read the customizing setup file 31D stored in the recording medium 103a using the drive device 103 of the information processing apparatus 100.

The customizing setup file 31D may not always be a text file which is described using a predetermined data form. The customizing setup file 31D may be a file readable with the screen definition data generating part 11. The customizing setup file 31D may be a binary file. When the customizing setup file 31D is the binary file, the user generates the binary file not with the text editor but with a predetermined setup tool.

Referring back to FIG. 4, the screen definition data generating part 11 transmits the generated customizing screen definition data 22De to the image processing apparatus 200 via the communicating unit 10. As a result, in the image processing apparatus 200, the received customizing screen definition data 22De are stored and held by the screen definition data holding part 22. Then, in the image processing apparatus 200, a screen based on the customizing screen definition data 22De is displayed by the screen generating part 23, and the customized display screen W (an integration screen illustrated in FIG. 9) is displayed by the screen controlling part 24.

As described, the screen customizing function of Embodiment 1 is realized by an interconnection action of the function units.

A detailed action of the screen customizing function (interconnection action of the function unit group) of Embodiment 1 is explained using a sequence chart illustrating processing.

The screen customizing function is realized by reading a program (i.e., software realizing the screen customizing function) to be installed in the information processing apparatus 100 and the image processing apparatus 200 from a storage such as the HDD 108 and the ROM 105 into a memory such as the RAM 104 and carrying out the following processes.

FIG. 12 is a sequence diagram indicative of an example of carrying out the screen customization of Embodiment 1. The screen customization is started by starting up the screen customizing tool in the information processing apparatus and causing the screen definition data generating part 11 to function.

Referring to FIG. 12, the information processing apparatus 100 determines existence of the customizing setup file 31D with the screen definition data generating part 11 at a time of starting the screen customizing tool in step S11. At this time, the screen definition data generating part 11 accesses the recording medium 103a and the HDD 108 to thereby determine whether the customizing setup file 31D is stored, readable, or stored and readable.

Subsequently, the screen definition data generating part 11 generates the customizing screen definition data De from the plural standard screen definition data 22Ds designated by the user so as to be integrated via the GUI in step S12. At this time, the screen definition data generating part 11 analyzes the designated plural standard definition data Ds with the data analyzing part 111 and specifies the data for generating the customizing screen definition data 22De based on the analysis result with the data specifying part 112. With this, the screen definition data generating part 11 generates the customizing screen definition data 22De based on the specified data. When it is determined that the customizing setup file 31D exists in step S11, the screen definition data generating part 11 reads the customizing setup file in step S11. With this, the screen definition data generating part 11 determines the attribute value of the tag defining the display content (the positions and sizes of the display components) based on the read setup value and generates the customizing screen definition data 22De in conformity with hardware specifications of the operations panel 220.

Subsequently, the screen definition data generating part 11 requests the communicating part 10 to transmit the generated customizing screen definition data 22De in step S13.

As a result, the information processing apparatus 100 transmits the customizing screen definition data 22De to the image processing apparatus 200 with the communicating part 10 in step S14. The communicating part 10 transmits the customizing screen definition data 22De based on the IP address of the image processing apparatus 200 designated by, for example, the screen definition data generating part 11 when the transmission is requested. The screen definition data generating part 11 receives designation of an apparatus whose screen is to be customized (e.g., designation of the image processing apparatus) when the designation of the standard screen definition data 22Ds is received as an object to be integrated and gives the designation information to the communicating part 10.

The information processing apparatus 100 generates the customizing screen definition data 22Ds and transmits the generated customizing screen definition data 22De to the image processing apparatus 200.

Subsequently, the image processing apparatus 200 receives the customizing screen definition data 22De by the communicating part 20, and an event of detecting the receipt is reported to the screen definition data administrating part 21 in step S21. At this time, the received customizing screen definition data 22De is transmitted from the communicating part 20 to the image definition data administrating part 21.

As a result, the image definition data administrating part 21 accesses the screen definition data holding part 22, stores the customizing screen definition data 22De in step S22, and the customizing screen definition data 22De is held by the screen definition data holding part 22 in step S23.

Subsequently, the screen definition data administrating part 21 requests the screen generating part 23 to generate the customized screen in step S24. At this time, the customizing screen definition data 22De received by the screen definition data administrating part from the communicating part 20 is transmitted to the screen generating part 23.

The screen generating part 23 reads the received customizing screen definition data 22De in step S25, generates the customizing screen (integration screen) based on the read data in step S26, and requests the screen controlling part 24 to display the screen in step S27. At this time, the generated customizing screen is transmitted to the screen controlling part 24.

As a result, the screen controlling part 24 displays the customizing screen on the operations panel 220 in step S28.

In the image processing apparatus 200 of Embodiment 1, the received customizing screen definition data 22De are held in a predetermined memory area by the above process, and the customizing screen (integration screen) is displayed on the operations panel 220.

<Data Generating Process on the Information Processing Apparatus>

Detailed explanation is given to the process of step S12 (customizing screen definition data generating process) with the screen definition data generating part 11.

Figure 13:
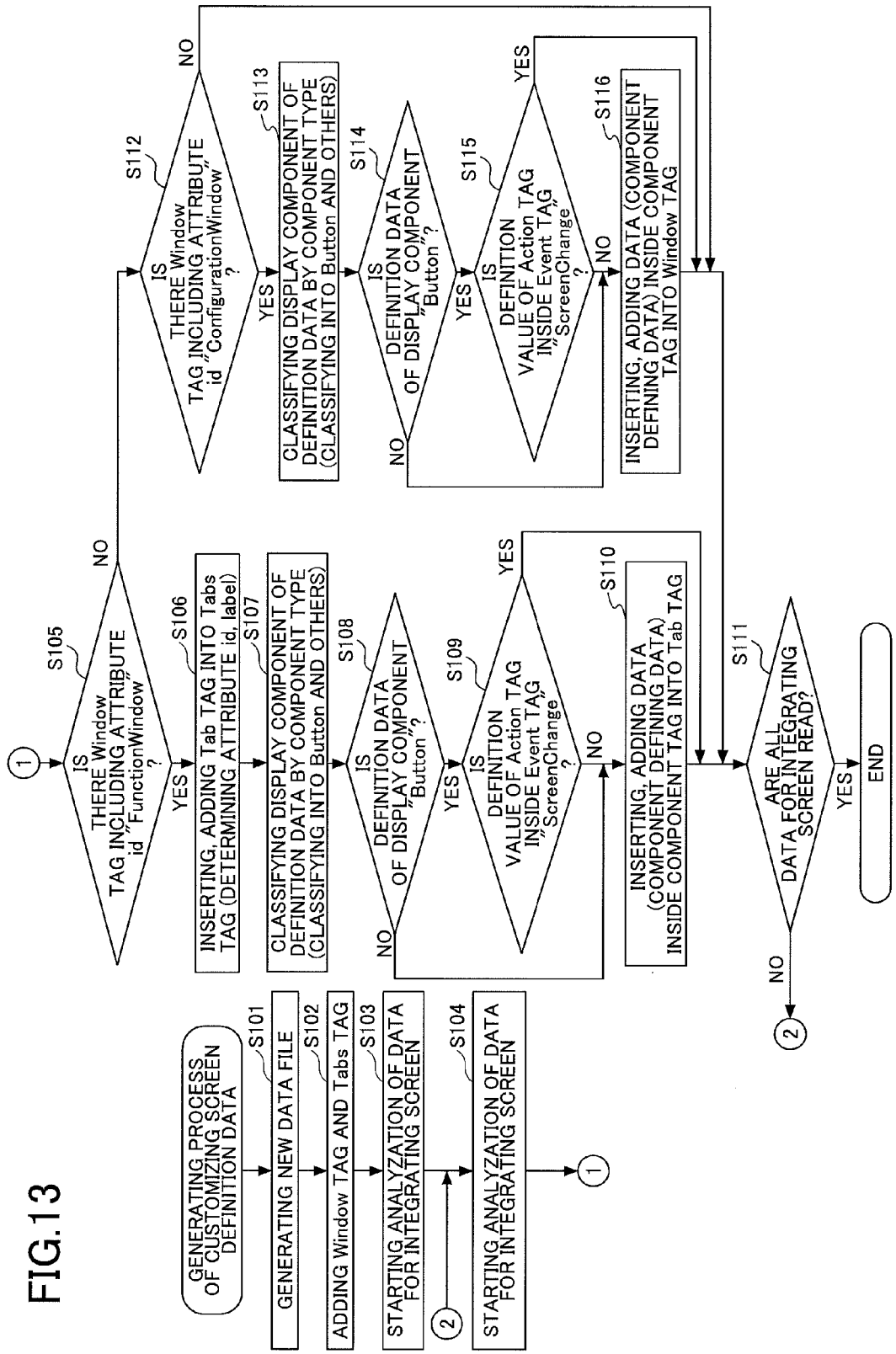
FIG. 13 illustrates a flowchart of a generating process of customizing screen definition data of Embodiment 1.
Figure 14B:
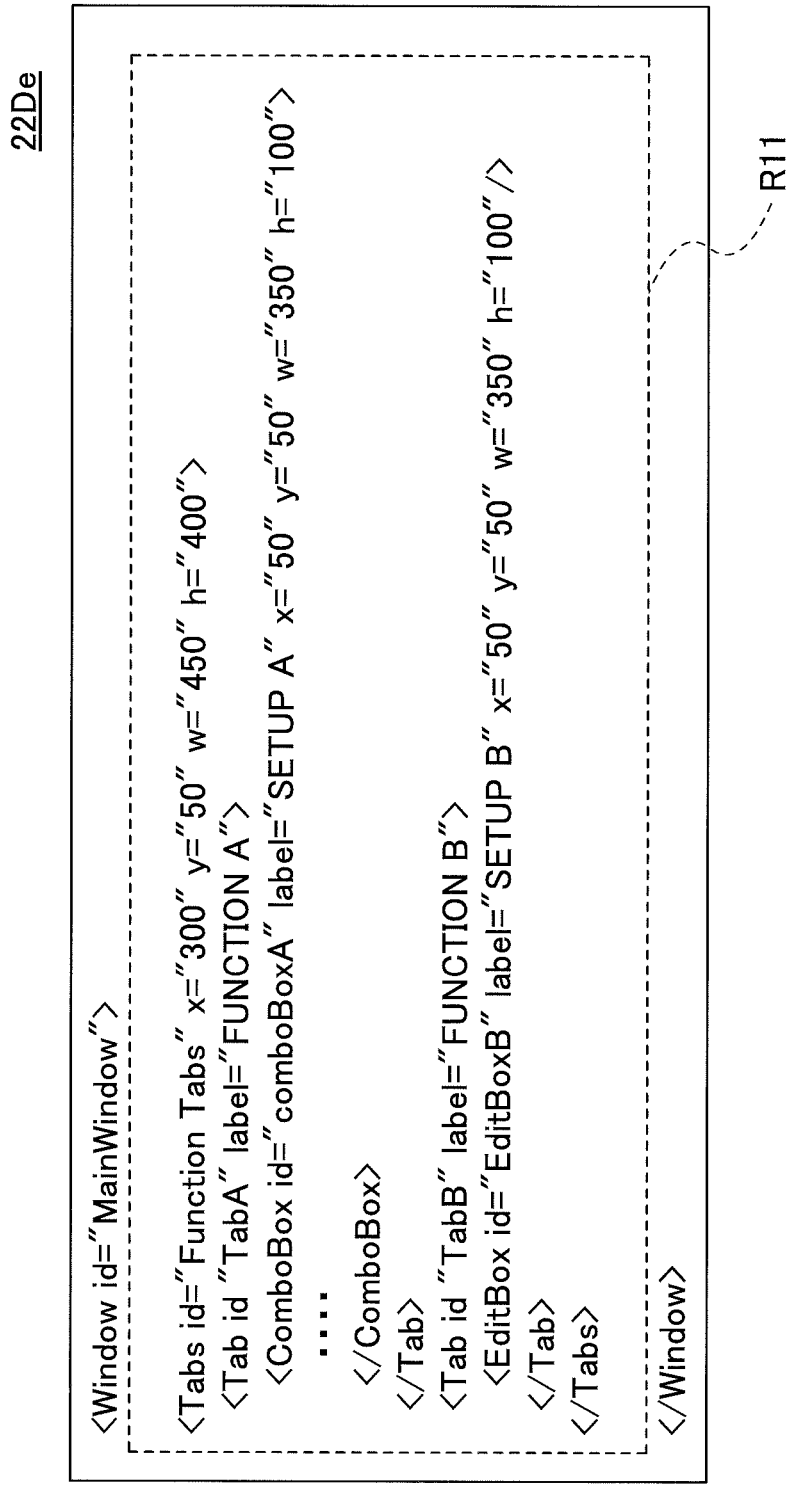

FIG. 13 is an example flowchart illustrating the generating process of the customizing screen definition data 22De of Embodiment 1. FIG. 14A, FIG. 14B and FIG. 14C illustrate data transition examples in generating customizing screen definition data of Embodiment 1. Referring to FIG. 13, the screen definition data generating part 11 carries out the following process and generates the customizing screen definition data 22De.

When the screen definition data generating part 11 receives a request for the screen customization (designation as an object to be integrated), the screen definition data generating part 11 generates a new data file (original data of customizing screen definition data) in step S101. The new data file is vacant and contains no data. The new data file is generated in the memory and opened.

Subsequently, the screen definition data generating part 11 adds the Window tag or the Tabs tag (the tag defining the screen type and the function integration screen) to the generated new data file as data in step S102. As a result, basic data of the customizing screen definition data 22De have a structure in which the Windows tag and the Tabs tag form a hierarchical structure (nested structure). At this time, the attribute values (x, y, w and h) of the Tabs tags are determined based on the setup value of the customizing setup file 31D.

Thereafter, the data analyzing part 111 of the screen definition data generating part 11 sequentially starts data analysis of the plural standard screen definition data 22Ds (data for integration screen) designated as the object of screen integration in step S103.

The data analyzing part ill searches tags inside the data for integration screen and acquires the definition data R defined by the tags as the analysis result in step S104. The acquired analysis result is transmitted to the data specifying part 112 of the screen definition data generating part 12.

The data specifying part 112 determines whether there is a Window tag including an id value of "FunctionWindow" in the definition data R being the analysis result. Said differently, the data specifying part 112 determines the definition data R having an integration function and the number of functions to be integrated using the attribute value of the Window tag.

The screen definition data generating part 11 inserts the Tab tag defining the function screen as data into the Tabs tag in step S106 when the data specifying part 112 determines that there is the Window tag including the id value of "FunctionWindow" in YES of step S105. At this time, the Tab tags as many as the number of the determined Window tags are added. At this time, the id values of the Tabs tags are determined based on the read customizing setup file 31D. The label values of the Tab tags are determined based on function identification information such as the name of the function defined in the definition data including the corresponding tags.

Subsequently, the data specifying part 112 classifies the definition data $R_{DB}$, $R_B$, $R_C$ and $R_R$ of the display component among the definition data R using the component type in step S107. At this time, the data specifying part 112 classifies into the definition data $R_B$ including a Button tag and the definition data $R_{DB}$, $R_C$ and $R_R$ which do not include a Button tag based on the attribute values (id values such as an EditBox tag, a Button tag, a ComboBox tag and a RadioButton tag) defining the display component.

The data specifying part 112 determines whether the definition data of the Action tag inside the Event tag defined in the definition data $R_B$ is "ScreenChange" in step S109 when the definition data R is the definition data $R_B$ including the Button tag based on the classified result in YES of step S108.

The screen definition data generating part 11 inserts data in the corresponding Button tag into the Tabs tag in step S110 when it is determined that the definition value is not "ScreenChange" by the data specifying unit 112 in NO of step S109. At this time, the attribute values (x, y, w and h) of the Button tags are determined based on the setup values of the read customizing setup file 31D.

On the other hand, when the definition value is determined by the data specifying part 112 of the screen definition data generating part 11 to be "ScreenChange" in YES of step S109, data in the Button tag are removed from the memory as data dispensable for generating the customizing screen definition data 22De.

When the definition data R are the definition data $R_{DB}$, $R_B$, $R_C$ and $R_R$ which do not include the Button tag based on the classification result in NO of step S108, various data in the corresponding EditBox tag, ComboBox tag, and RadioButton tag are inserted into the Tab tags in step S110. At this time, the attribute values (x, y, w and h) of the tags are determined based on the setup values of the read customizing setup file 31D. As a result, the customizing screen definition data 22De having the hierarchical structure of the Tabs tag and the Tabs tags as many as the number of the function illustrated in FIG. 14B are generated. The reference symbol R11 in FIG. 14B designates data inserted and added in steps S106 and S110.

When it is determined by the data specifying unit 112 that there is the Window tag including the id value of "FunctionWindow" in NO of step S105, the screen definition data generating part 11 determines whether there is a Window tag including an id value "ConfigurationWindow" in step S112. The data specifying part 112 is common to the various function by the attribute value of the window tag. The screen definition data generating part 11 classifies the definition data $R_{DB}$, $R_B$, $R_C$ and $R_R$ among the definition data R as the analysis result with the component type in step S113 when it is determined that the corresponding Window tag exists with the data specifying part 112 in YES of step S112. The process is similar to the process of step S107.

The data specifying part 112 determines whether the definition data of the Action tag inside the Event tag defined in the definition data $R_B$ is "ScreenChange" in step S114 when the definition data R is the definition data $R_B$ including the Button tag based on the classified result in YES of step S113. The process is similar to the process of step S108.

The screen definition data generating part 11 inserts data in the corresponding Button tag into the Windows tag in step S116 when it is determined that the definition value is not "ScreenChange" by the data specifying unit 112 in NO of step S115. At this time, the attribute values (x, y, w and h) of the Button tags are determined based on the setup value of the read customizing setup file 31D.

On the other hand, when the definition value is determined by the data specifying part 112 of the screen definition data generating part 11 to be "ScreenChange" in YES of step S115, data in the corresponding Button tag are removed from the memory as data dispensable for generating the customizing screen definition data 22De.

When the definition data R are the definition data $R_{DB}$, $R_B$, $R_C$ and $R_R$ which do not include the Button tag based on the classification result in NO of step S114, various data in the corresponding EditBox tag, ComboBox tag, and RadioButton tag are inserted into the Window tags in step S116. At this time, the attribute values (x, y, w and h) of the tags are determined based on the setup values of the read customizing setup file 31D. As a result, the customizing screen definition data 22De having a hierarchical structure of a Window tag and Radiobutton tags as many as the number of the display components illustrated in FIG. 14C are generated. The reference symbol R12 in FIG. 14C designates data inserted and added in steps S116.

The screen definition data generating part 11 caries out the above process for all the standard screen definition data 22Ds designated as an object to be integrated in NO of step S111.

After the screen definition data generating part 11 provides the above processes to all the standard screen definition data 22De in YES of step S111, the file of the customizing screen definition data 22De generated in the memory is closed.

An example where the customizing setup file 31D exists is described above. However, if the customizing setup file 31D does not exist, the attribute value of the tags may be determined based on, for example, a default setup value included in the screen definition data generating part 11.

In the information processing apparatus 100 of Embodiment 1, the customizing screen definition data 22De generated by the above process are transmitted to the image processing apparatus 200, and a display of the customizing screen is requested.

<Display Process of the Image Processing Apparatus>

The customizing screen display process at a time of starting the image processing apparatus 200 using the screen definition data administrating part 21, the screen generating part 23 and the screen controlling part 24 are described in detail.

Figure 15:
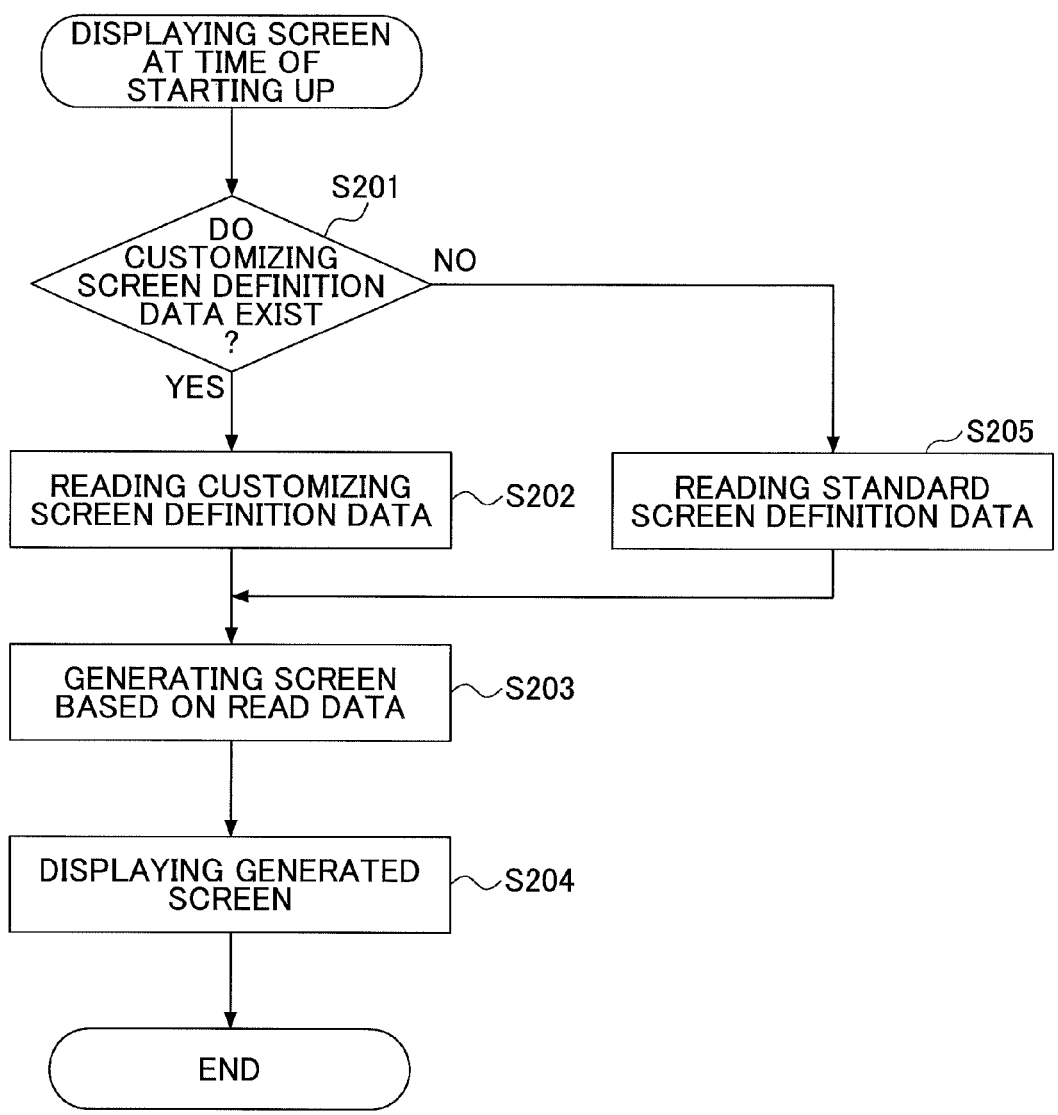
FIG. 15 is an example flowchart in displaying a screen of Embodiment 1.

FIG. 15 is an example flowchart in displaying a screen of Embodiment 1. Referring to FIG. 15, the image processing apparatus 200 confirms whether there exists the customizing screen definition data 22De with the screen definition data administrating part 21 after the image processing apparatus 200 starts up in step S201. The image definition data administrating part 21 accesses the screen definition data holding part 22 and determines whether the customizing screen definition data 22De are held in a predetermined memory area to thereby check the existence of the data.

The image processing apparatus confirms the existence of the customizing screen definition data 22De with the screen definition data administrating part 21 in YES of step S201. The confirmed customizing screen definition data 22De are read in the memory from the screen definition data holding part 22 and transmitted to the screen generating part 23 in step S202.

When the image processing apparatus 200 does not successfully confirm the existence of the customizing screen definition data 22De with the screen definition data administrating part 21 in NO of step S201, the standard screen definition data 22Ds are read in the memory from the screen definition data holding part 22 and transmitted to the screen generating part 23 in step S205.

The screen generating part 23 generates the customizing screen based on the read customizing screen definition data 22De or the standard screen definition data 22Ds in step S203 and requests the screen controlling part 24 to display the screen. At this time the screen generating part transmits the generated screen to the screen controlling part 24 and requests to display the generated screen.

As a result, the screen controlling part 24 displays the received screen on the operations panel 220 in step S204.

It is possible to set the image processing apparatus 200 so that the customizing screen is displayed or the standard screen is displayed at the time of starting up the image processing apparatus. The above process is carried out when the customizing screen is set to be displayed.

As described, the image processing apparatus 200 of Embodiment 1 generates a start screen based on the screen definition data 22D which is dynamically selected and displays the start screen on the operations panel 220.

MODIFIED EXAMPLE

Figure 16:
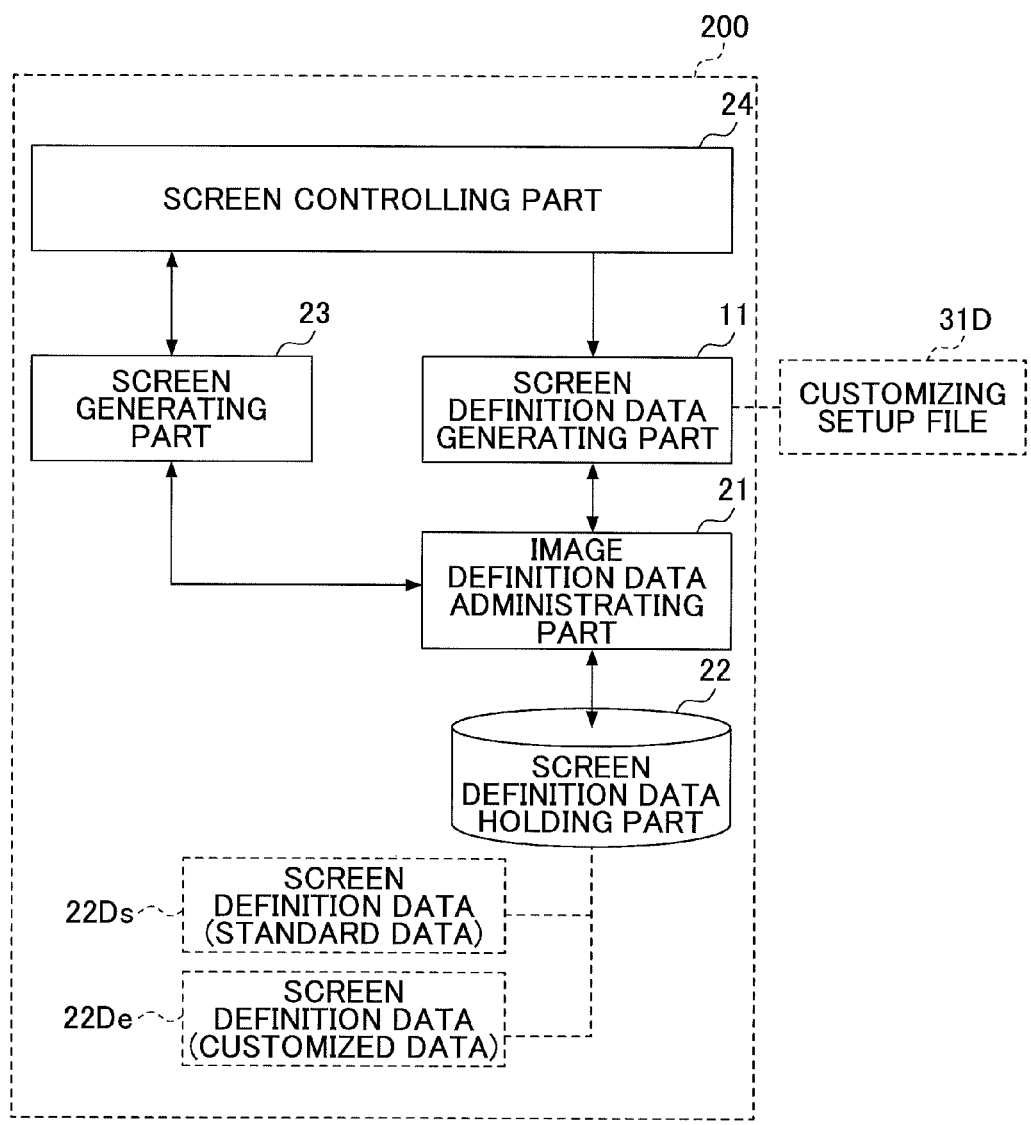
FIG. 16 illustrates a structural example of a screen customizing function of a modified example.

FIG. 16 illustrates an example structure of the screen customizing function of a modified example of Embodiment 1. Referring to FIG. 16, the image processing apparatus 200 may include the screen customizing function. In this case, the image processing apparatus 200 may functionally include the screen definition data generating part 11. The image processing apparatus 200 receives a screen customizing request such as a screen customizing request from a user (designation of standard screen definition data 22D to be integrated or the like) from the screen controlling part 24 via the operations panel 220 and reports the received screen customizing request to the screen definition data generating part 11.

Figure 17:
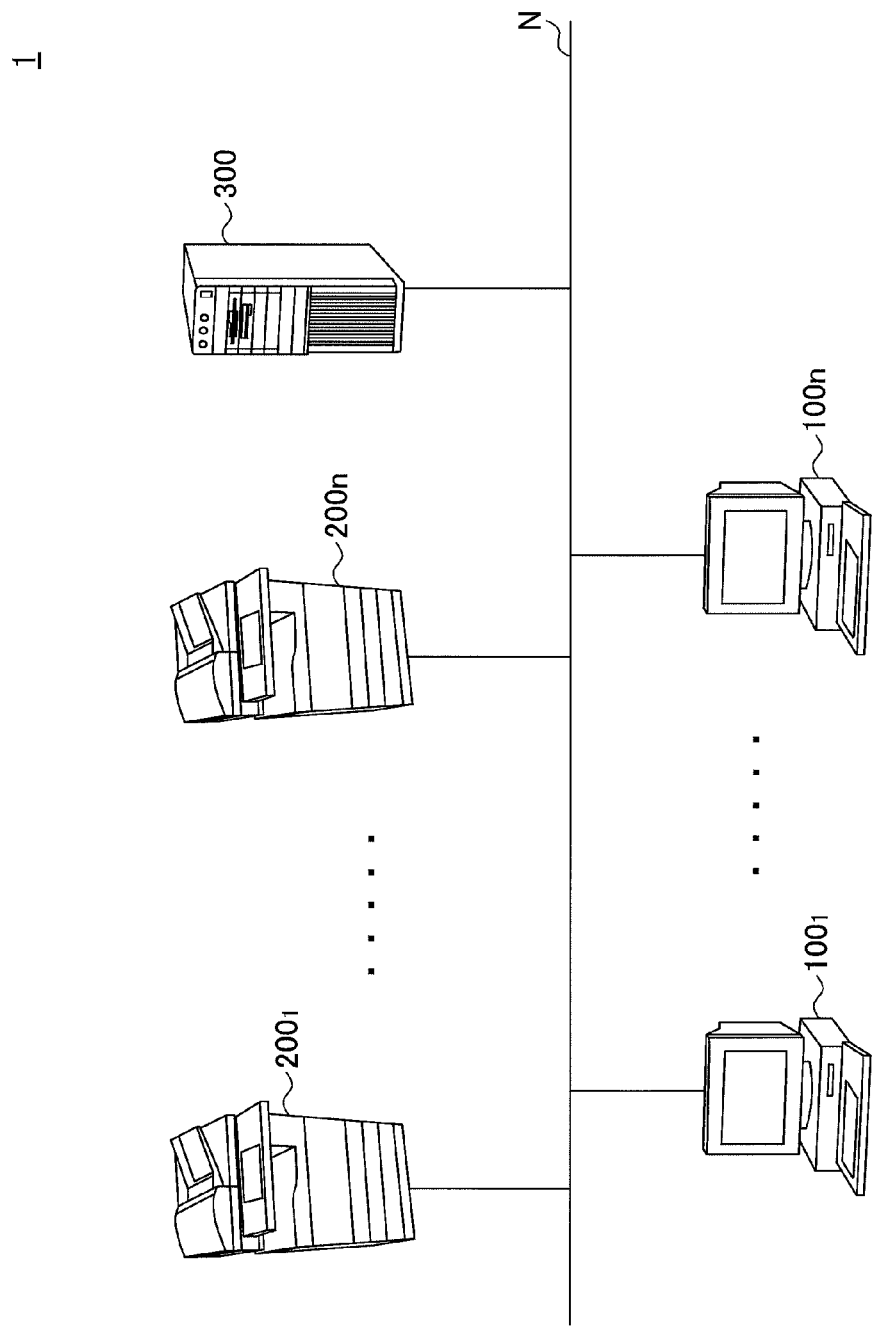
FIG. 17 illustrates a structural example of an image processing system of the modified example.

FIG. 17 illustrates a structural example of the image processing system 1 of the modified example of Embodiment 1. Referring to FIG. 17, the image processing system 1 may include a screen managing apparatus (screen managing server) 300 which manages a display screen W of the image processing apparatus 200. In this case, the image processing apparatus 300 may functionally include the screen definition data generating part 11 as illustrated in FIG. 18.

Figure 18:
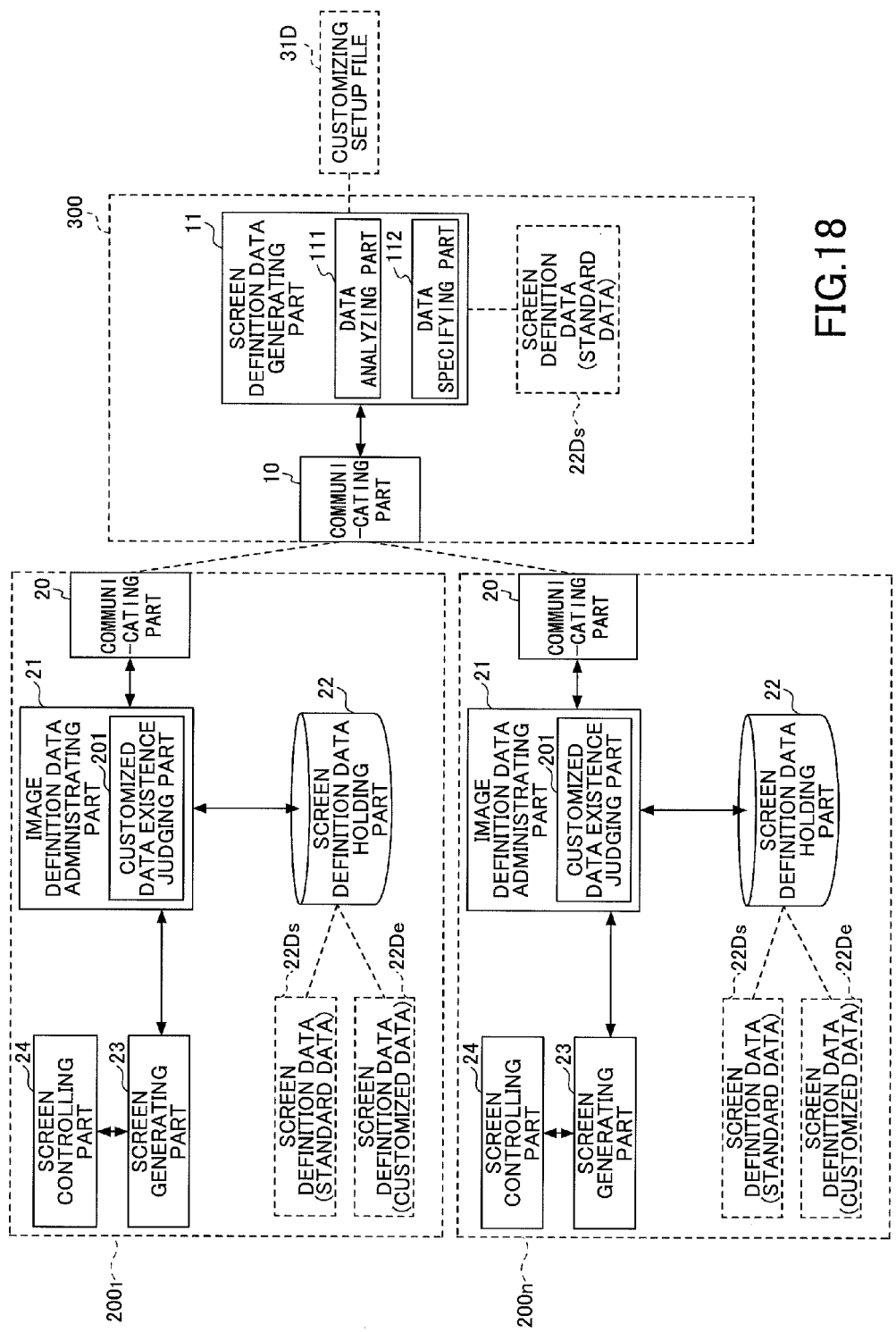
FIG. 18 illustrates a structural example of a screen customizing function of the modified example.

FIG. 18 illustrates an example structure of the screen customizing function of the modified example of Embodiment 1. In the image processing system 1 of the modified example of Embodiment 1, the following screen customization can be carried out by the functional structure illustrated in FIG. 18.

In the image processing system 1 of the modified example of Embodiment 1, the screen customization can be collectively carried out for plural image processing apparatuses 200 to be administrated. The screen managing apparatus 300 may collectively transmit the customizing screen definition data 22De generated by the screen definition data generating part 11 to the image processing apparatuses 200 in compliance with an execution instruction by an administrator.

The image processing system 1 of the modified example can easily administrate the screens for each type. When the number of the image processing apparatuses 200 is large, work of customizing the screens in response to the apparatuses becomes cumbersome. The screen managing apparatus 300 generates the customizing screen definition data 22De for each type by the screen definition data generating part 11, and the image processing apparatus 200 acquires the customizing screen definition data 22De from the screen managing apparatus 300 based on the type information.

<General Overview>

With the image processing system 1 of Embodiment 1, the following processes are associated by the information processing apparatus 100 and the image processing apparatus 200 to thereby realize the screen customizing function with the following associating process. First, the information processing apparatus 100 analyzes plural standard screen definition data 22Ds to be integrated by the data analyzing part 111 of the screen definition data generating part 11. Subsequently, the information processing apparatus 100 specifies data necessary for generating the customizing screen definition data 22De (the screen definition data of the integration screen) among the data contained in the screen definition data R based on the analysis result (definition data R such as the screen type, the display component and the screen definition data R obtained by the analysis) with the data specifying part 112 of the screen definition data generating part 11. Said differently, the information processing apparatus 100 does not simply integrate the plural screen definition data 22D but data for integrating or customizing the screen are dynamically determined based on the content of the definition and extracted from the plural screen definition data 22D. With this, the screen definition data generating part 11 of the information processing apparatus 100 generates the customizing screen definition data 22De based on the specified data. As a result, the information processing apparatus 100 transmits the customizing screen definition data 22De generated by the communicating part 10 to the image processing apparatus 200. The image processing apparatus 200 displays a screen with the screen controlling part 24 after generating the customized screen (integration screen) based on the received customizing screen definition data 22De.

With this, the image processing system 1 of Embodiment 1 can automatically customize the screen by integrating the plural screens when a user designates the display screen to be integrated. In the image processing system 1 of Embodiment 1, a developer does not always have to change the screen display software when the screen is customized.

Although Embodiment 1 has been described, the "screen customizing function" of Embodiment 1 may be realized when the program is obtained by coding the various processes described above in the programming language of a control unit such as a CPU of the image processing apparatus 100 or the image processing apparatus 200 suitable for the action environment (platform).

The programs may be stored in the computer readable media 103a and 214a. With this, the program stored in the computer readable media 103a and 214a may be installed in the information processing apparatus 100 and the image processing apparatus 200 via the drive device 103 and the external memory I/F 214. Because the information processing apparatus 100 and the image processing apparatus 200 include the interface device 107 and the network I/F 213, it is possible to download the programs via a telecommunications circuit.

With Embodiment 1 described above, the customizing screen definition data 22De have been transmitted to the image processing apparatus 200 from the information processing apparatus 100, and the screen has been customized. However, the present invention is not limited above. For example, the information processing apparatus 100 stores the generated customizing screen definition data 22De in the recording medium 103a. The image processing apparatus 200 reads the held data from the recording medium 204a via the external memory I/F 204, and the customizing screen definition data 22De are acquired.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-104049 filed on Apr. 28, 2010, the entire contents of which are hereby incorporated herein by reference.

What is claimed is:

1. An information processing apparatus comprising:
   a data analyzing part substantialized by a processor to analyze definition data of a first screen, definition data of a second screen, and definition data of a third screen, the first screen being capable of changing to the third screen using screen transition by operating a part of first screen display components included in the definition data of the first screen, and the second screen being capable of changing to the third screen using screen transition by operating a part of second screen display components included in the definition data of the second screen; and
   a generation part substantialized by the processor to generate customizing screen definition data, which include another part of the first screen display components and/or another part of the second screen display components, which includes a part of third screen display components included in the definition data of the third screen and which do not include at least the part of the first screen display components and the part of the second screen display components.

2. The information processing apparatus according to claim 1, further comprising:
   a data specifying part substantialized by the processor to specify data to be used for generating the customizing screen definition data, in which an integration display content of an integration screen is defined among the definition data based on an analysis result obtained by the data analyzing part; and
   a communicating part configured to transmit the customizing screen definition data generated by the generation part to an image processing apparatus, which has a display device and is connected to the information processing apparatus via a predetermined data transmission line,
   wherein the data analyzing part accesses a predetermined memory area included in the image processing apparatus in order to obtain the definition data including a screen type, the first, second and third screen display components and/or a screen transition event when the information processing apparatus receives an instruction to integrate a plurality of the screens from a user.

3. The information processing apparatus according to claim 2,
   wherein the analysis result obtained by the data analyzing part, based on which the data specifying part specifies the data to be used for generating the customizing screen definition data, is the screen type, the first, second and third screen display components, or the screen transition event or two or more of the screen type, the first, second and third screen display components and the screen transition event.

4. The information processing apparatus according to claim 3,
   wherein the analysis result obtained by the data analyzing part, based on which the data specifying part specifies the data to be used for generating the customizing screen definition data, is an attribute value of the screen type included in the definition data.

5. The information processing apparatus according to claim 3,
   wherein the data specifying part determines whether the first, second and third screen display components cause the screen transition, and
   the definition data, in which the first, second and third screen display components determined not to cause the screen transition is defined, are specified as the data to be used for generating the customizing screen definition data.

6. The information processing apparatus according to claim 3,
   wherein the generation part generates the customizing screen definition data by inserting and adding the data specified by the data specifying part into the definition data in which the screen type of the integration screen is defined.

7. An information processing system in which an information processing apparatus is connected to an image processing apparatus by a predetermined data transmission line,
   wherein the information processing apparatus includes
   a data analyzing part substantialized by a processor to analyze definition data of a first screen, definition data of a second screen, and definition data of a third screen, the first screen being capable of changing to the third screen using screen transition by operating a part of first screen display components included in the definition data of the first screen, and the second screen being capable of changing to the third screen using screen transition by operating a part of second screen display components included in the definition data of the second screen; and
   a generation part substantialized by the processor to generate customizing screen definition data, which include another part of the first screen display components and/or another part of the second screen display components, which includes a part of third screen display components included in the definition data of the third screen and which do not include at least the part of the first screen display components and the part of the second screen display components,
   wherein the image processing apparatus includes
   a display device configured to display a customizing screen based on the customizing screen definition data; and
   a predetermined memory area holding the definition data of the first, second and third screens.

8. The information processing system according to claim 7, wherein the information processing apparatus further includes
 a data specifying part substantialized by the processor to specify data to be used for generating the customizing screen definition data, in which an integration display content of an integration screen is defined among the definition data based on an analysis result obtained by the data analyzing part; and
 a communicating part configured to transmit the customizing screen definition data generated by the generation part to the image processing apparatus,
 wherein the data analyzing part accesses the predetermined memory area included in the image processing apparatus in order to obtain the definition data including a screen type, the first, second and third display components and/or a screen transition event when the information processing apparatus receives an instruction to integrate a plurality of the screens from a user,
wherein the image processing apparatus further includes
 a screen generation part configured to generate the customizing screen based on the customizing screen definition data transmitted from the information processing apparatus; and
 a screen controlling part configured to control the display device to display the customizing screen generated by the screen generation part.

9. The information processing system according to claim 8, wherein the analysis result obtained by the data analyzing part, based on which the data specifying part specifies the data to be used for generating the customizing screen definition data, is the screen type, the first, second and third display components, or the screen transition event or two or more of the screen type, the first, second and third display components and the screen transition event.

10. The information processing system according to claim 9, wherein the analysis result obtained by the data analyzing part, based on which the data specifying part specifies the data used for generating the customizing screen definition data, is an attribute value of the screen type included in the definition data.

11. The information processing system according to claim 9,
 wherein the data specifying part determines whether the first, second and third display components cause the screen transition, and
 the definition data, in which the first, second and third display components determined not to cause the screen transition is defined, are specified as the data to be used for generating the customizing screen definition data.

12. The information processing system according to claim 9,
 wherein the generation part generates the customizing screen definition data by inserting and adding the data specified by the data specifying part into the definition data in which the screen type of the integration screen is defined.

13. An information processing method used in an information processing apparatus, the information processing method comprising:
 analyzing, by a processor, definition data of a first screen, definition data of a second screen, and definition data of a third screen, the first screen being capable of changing to the third screen using screen transition by operating a part of first screen display components included in the definition data of the first screen, and the second screen being capable of changing to the third screen using screen transition by operating a part of second screen display components included in the definition data of the second screen; and
 generating, by the processor, customizing screen definition data, which include another part of the first screen display components and/or another part of the second screen display components, which includes a part of third screen display components included in the definition data of the third screen and which do not include at least the part of the first screen display components and the part of the second screen display components.

14. The information processing method according to claim 13, further comprising:
 specifying, by the processor, data to be used for generating the customizing screen definition data, in which an integration display content of an integration screen is defined among the definition data based on an analysis result obtained by the analyzing; and
 transmitting the customizing screen definition data generated by the generating to an image processing apparatus, which has a display device and is connected to the information processing apparatus via a predetermined data transmission line,
 wherein the analyzing accesses a predetermined memory area included in the image processing apparatus in order to obtain the definition data including a screen type, the first, second and third display components and/or a screen transition event when the information processing apparatus receives an instruction to integrate a plurality of the screens from a user.

15. The information processing method according to claim 14,
 wherein the analysis result obtained by the analyzing, based on which the specifying specifies the data to be used for generating the customizing screen definition data, is the screen type, the first, second and third display components, or the screen transition event or two or more of the screen type, the first, second and third display components and the screen transition event.

16. The information processing method according to claim 15,
 wherein the analysis result obtained by the analyzing, based on which the specifying specifies the data to be used for generating the customizing screen definition data, is an attribute value of the screen type included in the definition data.

17. The information processing method according to claim 15,
 wherein the specifying determines whether the first, second and third display components cause the screen transition, and
 the definition data, in which the first, second and third display components determined not to cause the screen transition is defined, are specified as the data to be used for generating the customizing screen definition data.

18. The information processing method according to claim 15,
 wherein the generating generates the customizing screen definition data by inserting and adding the data specified by the specifying into the definition data in which the screen type of the integration screen is defined.

* * * * *